United States Patent
Hoffman

(12) 
(10) Patent No.: US 6,278,799 B1
(45) Date of Patent: Aug. 21, 2001

(54) HIERARCHICAL DATA MATRIX PATTERN RECOGNITION SYSTEM

(76) Inventor: Efrem H. Hoffman, 42 Manren Crescent, Winnipeg, Manitoba (CA), R2P 0N6

( * ) Notice: Subject to any disclaimer, the term of this patent is extended or adjusted under 35 U.S.C. 154(b) by 0 days.

(21) Appl. No.: 09/490,849

(22) Filed: Jan. 24, 2000

Related U.S. Application Data

(63) Continuation of application No. 08/814,473, filed on Mar. 10, 1997, now Pat. No. 6,035,057.

(30) Foreign Application Priority Data

Oct. 3, 1997 (CA) .................................................. 2199588

(51) Int. Cl.⁷ ..................................................... G06K 9/62
(52) U.S. Cl. ......................... 382/159; 382/155; 382/156; 382/157; 706/15; 706/20
(58) Field of Search .................................... 382/155, 156, 382/157, 159, 158; 706/15, 20, 25, 44, 23

(56) References Cited

U.S. PATENT DOCUMENTS

| | | | |
|---|---|---|---|
| 5,235,673 | * 8/1993 | Austvold et al. | 706/44 |
| 5,274,745 | * 12/1993 | Takashi | 706/25 |
| 5,428,644 | * 6/1995 | Kohonen | 375/340 |
| 5,729,662 | * 3/1998 | Rozmus | 706/20 |
| 5,835,901 | * 11/1998 | Duvoisin, III et al. | 706/19 |

OTHER PUBLICATIONS

Shinozawa, et al. "a weather radar image prediction method in local parallel computation", IEEE, pp. 4210–4215, 1994.*

Ranganath, et al. "self partitioning backpropagation network for target recognition", IEEE, pp. 30–36, 1995.*

Fogler, et al. "feature discovery via neural networks for object recognition in SAR imagery", IEEE, pp. 408–413, 1992.*

Kohonen "the self–organizing map", IEEE, pp. 1464–1480, 1990.*

Hsu, et al. "a high noise recognition system with self–organizing features", IEEE, pp. 2121–2125, 1995.*

Ladage, et al. "scatter identification using neural networks". IEEE, 900–904, 1992.*

Langi, et al. "Intelligent Storm Identification System Using Hierarchical Neural Network", IEEE, pp. 501–504, 1994.*

\* cited by examiner

*Primary Examiner*—Leo Boudreau
*Assistant Examiner*—Daniel G. Mariam
(74) *Attorney, Agent, or Firm*—Adrian D. Battison

(57) ABSTRACT

The present invention relates to a hierarchical artificial neural network (HANN) for automating the recognition and identification of patterns in data matrices. It has particular, although not exclusive, application to the identification of severe storm events (SSEs) from spatial precipitation patterns, derived from conventional volumetric radar imagery. To identify characteristic features a data matrix, the data matrix is processed with a self organizing network to produce a self organizing feature space mapping. The self organizing feature space mapping is processed to produce a density characterization of the feature space mapping. The self organizing network is preferably completely unsupervised. It may, under some circumstances include a supervised layer, but it must include at least an unsupervised component for the purposes of the invention. The "self organizing feature space" is intended to include any map with the self organizing characteristics of the Kohonen Self Organizing Feature Map. The frequency vector of a CAPPI image that has been derived is a data abstraction that can be displayed directly for examination. In preferred embodiments, it is presented to a classification network, e. g. the standard CPN network, for classifying the density vector representation of the three dimensional data and displaying a representation of classified features in the three dimensional data. A novel methodology is preferably used for incorporating vigilance and conscience mechanisms in the forward counterpropagation network during training.

25 Claims, 28 Drawing Sheets

| 93854 | 48133 | 27902 | 16314 | 12948 | 10917 | 16076 | 13704 | 16432 | 28892 | 15334 | 9672 | 6713 | 7407 | 8388 |
|---|---|---|---|---|---|---|---|---|---|---|---|---|---|---|
| 49251 | 45032 | 28238 | 19873 | 10284 | 11926 | 11885 | 14150 | 18583 | 15693 | 10823 | 10589 | 6187 | 5756 | 7476 |
| 31178 | 34284 | 23055 | 19644 | 13934 | 11873 | 15486 | 15553 | 25554 | 14043 | 9799 | 8341 | 7532 | 5156 | 4076 |
| 27020 | 25253 | 24921 | 22503 | 15210 | 13737 | 15929 | 17106 | 22604 | 13390 | 8398 | 8259 | 7433 | 5546 | 2874 |
| 29212 | 27864 | 21002 | 17480 | 13048 | 13042 | 13824 | 16605 | 15544 | 10753 | 7622 | 6059 | 4261 | 4493 | 2308 |
| 41225 | 25735 | 20667 | 17076 | 15412 | 13919 | 14158 | 11411 | 10601 | 8452 | 7003 | 4169 | 3546 | 3391 | 2860 |
| 26621 | 22183 | 19919 | 15706 | 14535 | 13066 | 10841 | 9412 | 7795 | 7314 | 8627 | 4355 | 2970 | 3282 | 6188 |
| 23193 | 22130 | 18715 | 17060 | 14139 | 12509 | 9761 | 6916 | 5014 | 7019 | 6510 | 2513 | 2884 | 5288 | 4222 |
| 22278 | 18968 | 17197 | 13327 | 13101 | 11920 | 8559 | 8248 | 7515 | 5324 | 3815 | 4162 | 3180 | 4765 | 7153 |
| 20779 | 18892 | 16208 | 14388 | 13346 | 12226 | 11674 | 9966 | 8892 | 6458 | 3795 | 2555 | 2429 | 4547 | 5233 |
| 22409 | 19709 | 17623 | 14502 | 12995 | 11030 | 9935 | 8486 | 5456 | 5804 | 3236 | 3379 | 2004 | 2186 | 3255 |
| 27959 | 19257 | 15965 | 15236 | 12544 | 10550 | 9322 | 7006 | 7714 | 4428 | 3718 | 2354 | 2412 | 1576 | 1092 |
| 24141 | 21197 | 18162 | 15918 | 12756 | 10628 | 8613 | 6819 | 7541 | 6750 | 3110 | 3251 | 1205 | 1226 | 1170 |
| 25362 | 20574 | 17136 | 14752 | 13111 | 10631 | 8502 | 6254 | 6598 | 4962 | 3360 | 1868 | 1479 | 1423 | 699 |
| 30656 | 21464 | 17553 | 14767 | 12637 | 10827 | 9344 | 8381 | 5982 | 6592 | 3450 | 1879 | 1063 | 319 | 873 |

Matrix 5

T3

| 0 | 2 | 4 | 3 | 4 | 6 | 9 | 4 | 9 | 3 | 9 | 5 | 4 | 12 | 6 |
|---|---|---|---|---|---|---|---|---|---|---|---|---|---|---|
| 5 | 1 | 4 | 6 | 10 | 5 | 2 | 1 | 7 | 7 | 9 | 5 | 1 | 0 | 1 |
| 6 | 12 | 2 | 5 | 7 | 1 | 1 | 1 | 8 | 3 | 9 | 3 | 8 | 3 | 1 |
| 11 | 7 | 5 | 2 | 6 | 2 | 6 | 3 | 4 | 5 | 1 | 5 | 3 | 4 | 4 |
| 7 | 9 | 7 | 4 | 2 | 1 | 3 | 2 | 6 | 1 | 1 | 0 | 1 | 6 | 3 |
| 5 | 7 | 8 | 4 | 2 | 1 | 2 | 1 | 2 | 2 | 7 | 2 | 3 | 3 | 2 |
| 12 | 2 | 3 | 3 | 1 | 5 | 3 | 2 | 3 | 0 | 2 | 1 | 1 | 4 | 10 |
| 5 | 10 | 5 | 4 | 1 | 4 | 0 | 0 | 0 | 1 | 1 | 3 | 3 | 1 | 2 |
| 3 | 5 | 5 | 0 | 0 | 0 | 0 | 1 | 2 | 0 | 0 | 2 | 1 | 9 | 2 |
| 4 | 7 | 4 | 2 | 1 | 0 | 3 | 2 | 2 | 4 | 1 | 2 | 3 | 3 | 5 |
| 13 | 7 | 9 | 6 | 3 | 0 | 1 | 0 | 0 | 1 | 2 | 0 | 2 | 0 | 4 |
| 21 | 9 | 9 | 2 | 1 | 0 | 0 | 1 | 1 | 1 | 0 | 1 | 3 | 3 | 2 |
| 21 | 19 | 14 | 3 | 0 | 2 | 0 | 0 | 2 | 3 | 0 | 0 | 3 | 0 | 5 |
| 38 | 21 | 1 | 0 | 0 | 0 | 0 | 0 | 0 | 2 | 0 | 1 | 1 | 0 | 1 |
| 66 | 11 | 7 | 0 | 0 | 0 | 0 | 0 | 0 | 2 | 1 | 0 | 3 | 6 | 8 |

MATRIX 6

H1

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 1 | 1 | 1 |
| 0 | 0 | 0 | 0 | 0 | 0 | 0 | 0 | 0 | 0 | 0 | 0 | 0 | 2 | 0 |
| 0 | 0 | 0 | 0 | 0 | 0 | 0 | 0 | 0 | 0 | 0 | 0 | 2 | 0 | 4 |
| 1 | 1 | 0 | 1 | 1 | 1 | 2 | 0 | 1 | 0 | 1 | 0 | 0 | 0 | 3 |
| 0 | 0 | 1 | 0 | 0 | 0 | 0 | 1 | 0 | 0 | 0 | 0 | 0 | 1 | 1 |
| 0 | 0 | 1 | 1 | 0 | 1 | 1 | 2 | 1 | 1 | 4 | 0 | 2 | 3 | 0 |
| 0 | 0 | 0 | 0 | 1 | 0 | 3 | 2 | 3 | 0 | 0 | 3 | 0 | 0 | 1 |
| 0 | 0 | 1 | 4 | 0 | 0 | 1 | 1 | 0 | 2 | 1 | 0 | 4 | 1 | 2 |
| 0 | 1 | 1 | 0 | 0 | 2 | 2 | 3 | 1 | 0 | 1 | 2 | 5 | 0 | 2 |
| 0 | 0 | 0 | 0 | 0 | 0 | 0 | 1 | 3 | 0 | 3 | 0 | 0 | 4 | 4 |
| 0 | 0 | 1 | 0 | 1 | 1 | 0 | 1 | 0 | 0 | 1 | 1 | 3 | 6 | 1 |
| 0 | 0 | 0 | 0 | 1 | 0 | 1 | 0 | 1 | 1 | 0 | 0 | 4 | 2 | 5 |
| 0 | 0 | 0 | 0 | 0 | 0 | 0 | 0 | 2 | 0 | 1 | 3 | 0 | 0 | 3 |
| 0 | 0 | 0 | 0 | 0 | 0 | 0 | 0 | 1 | 1 | 1 | 2 | 4 | 16 | 5 |

MATRIX 7

| 0 | 0 | 0 | 0 | 0 | 0 | 0 | 0 | 0 | 0 | 0 | 0 | 0 | 0 | 1 |
|---|---|---|---|---|---|---|---|---|---|---|---|---|---|---|
| 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 2 | 4 |
| 0 | 0 | 0 | 0 | 0 | 0 | 0 | 0 | 0 | 0 | 0 | 0 | 2 | 0 | 8 |
| 0 | 0 | 0 | 0 | 1 | 0 | 1 | 0 | 0 | 0 | 0 | 0 | 21 | 6 | 12 |
| 0 | 0 | 0 | 0 | 0 | 0 | 0 | 0 | 0 | 1 | 2 | 5 | 10 | 3 | 6 |
| 0 | 0 | 0 | 1 | 1 | 0 | 2 | 1 | 6 | 7 | 0 | 8 | 5 | 2 | 2 |
| 0 | 0 | 1 | 0 | 2 | 9 | 8 | 3 | 61 | 4 | 2 | 16 | 4 | 0 | 1 |
| 0 | 0 | 1 | 3 | 2 | 3 | 9 | 10 | 8 | 12 | 7 | 2 | 11 | 1 | 0 |
| 0 | 1 | 0 | 2 | 1 | 10 | 0 | 3 | 0 | 2 | 23 | 20 | 8 | 2 | 4 |
| 3 | 3 | 4 | 1 | 11 | 3 | 7 | 9 | 27 | 10 | 6 | 4 | 5 | 10 | 4 |
| 0 | 6 | 5 | 3 | 18 | 20 | 29 | 14 | 0 | 5 | 25 | 6 | 5 | 18 | 22 |
| 1 | 2 | 2 | 20 | 15 | 20 | 18 | 34 | 4 | 0 | 5 | 8 | 11 | 17 | 29 |
| 22 | 17 | 86 | 71 | 210 | 46 | 150 | 190 | 8 | 7 | 11 | 13 | 8 | 28 | 10 |
| 1 | 67 | 62 | 170 | 190 | 230 | 420 | 13 | 22 | 4 | 19 | 13 | 25 | 33 | 17 |

MATRIX 8

T1

MATRIX 9

| 0 | 0 | 3 | 2 | 1 | 10 | 5 | 7 | 2 | 1 | 0 | 7 | 4 | 10 | 9 |
|---|---|---|---|---|---|---|---|---|---|---|---|---|---|---|
| 1 | 1 | 0 | 1 | 7 | 3 | 4 | 3 | 1 | 0 | 7 | 1 | 1 | a | 9 |
| 0 | 1 | 1 | 4 | 2 | 8 | 4 | 4 | 1 | 4 | 2 | 10 | 6 | 12 | 6 |
| 2 | 2 | 3 | 2 | a | 3 | 4 | 0 | 0 | 4 | 12 | 8 | 5 | 9 | 12 |
| 1 | 2 | 6 | 2 | a | 6 | 10 | 1 | 1 | 7 | 5 | 4 | 5 | a | 13 |
| 1 | 0 | 0 | 2 | 15 | 4 | 5 | a | 2 | 5 | 7 | 2 | 9 | 5 | 10 |
| 3 | 2 | 2 | 10 | 1 | 6 | a | 3 | 3 | 5 | a | 3 | 4 | is | 10 |
| l | 1 | 1 | 3 | 3 | 5 | 4 | 10 | 9 | 1 | 7 | 5 | 11 | 11 | a |
| 2 | 2 | 4 | a | 3 | 13 | 12 | 2 | 5 | 1 | 2 | 4 | 3 | a | a |
| 2 | 3 | 2 | 24 | 1 | 11 | 18 | 2 | 8 | 1 | 2 | 5 | 10 | 11 | 7 |
| 5 | 1 | 2 | 2 | 9 | 6 | 4 | 7 | 5 | 4 | 10 | 9 | 5 | 14 | 21 |
| 0 | 3 | 4 | 10 | 23 | 9 | a | 11 | 7 | 5 | 9 | a | 7 | 14 | 11 |
| 2 | 1 | 2 | 10 | 19 | 5 | 3 | 3 | 7 | a | 5 | 4 | 4 | 14 | 13 |
| 3 | 5 | 30 | 32 | 18 | 8 | 0 | 1 | 4 | 4 | 3 | a | a | Is | 9 |
| 0 | 24 | 30 | 34 | 16 | 9 | 1 | 3 | 2 | a | 2 | 4 | 15 | 14 | 8 |

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 3 | 2 |
| 0 | 0 | 0 | 0 | 0 | 0 | 0 | 0 | 0 | 0 | 1 | 0 | 1 | 2 | 2 |
| 0 | 0 | 0 | 0 | 0 | 0 | 0 | 0 | 0 | 0 | 0 | 0 | 0 | 1 | 1 |
| 0 | 0 | 0 | 0 | 0 | 0 | 0 | 0 | 0 | 1 | 0 | 0 | 2 | 6 | 3 |

MATRIX 10

| | | | | | | | | | | | | | | |
|---|---|---|---|---|---|---|---|---|---|---|---|---|---|---|
| 0 | 2 | 4 | 3 | 4 | 6 | 9 | 4 | 9 | 3 | 9 | 5 | 4 | 12 | 6 |
| 5 | 1 | 4 | 6 | 10 | 5 | 2 | 1 | 7 | 7 | 9 | 5 | 1 | 0 | 1 |
| 6 | 12 | 2 | 5 | 7 | 1 | 1 | 1 | 8 | 3 | 9 | 3 | 8 | 3 | 1 |
| 11 | 7 | 5 | 2 | 6 | 2 | 6 | 3 | 4 | 5 | 1 | 5 | 3 | 4 | 4 |
| 7 | 9 | 7 | 4 | 2 | 1 | 3 | 2 | 6 | 1 | 1 | 0 | 1 | 6 | 3 |
| 5 | 7 | 8 | 4 | 2 | 1 | 2 | 1 | 2 | 2 | 7 | 2 | 3 | 3 | 2 |
| 12 | 2 | 3 | 3 | 1 | 5 | 3 | 2 | 3 | 0 | 2 | 1 | 1 | 4 | 10 |
| 5 | 10 | 5 | 4 | 1 | 4 | 0 | 0 | 0 | 1 | 1 | 3 | 3 | 1 | 2 |
| 3 | 5 | 5 | 0 | 0 | 0 | 0 | 1 | 2 | 0 | 0 | 2 | 1 | 9 | 2 |
| 4 | 7 | 4 | 2 | 1 | 0 | 3 | 2 | 2 | 4 | 1 | 2 | 3 | 3 | 5 |
| 13 | 7 | 9 | 6 | 3 | 0 | 1 | 0 | 0 | 1 | 2 | 0 | 2 | 0 | 4 |
| 21 | 9 | 9 | 2 | 1 | 0 | 0 | 1 | 1 | 1 | 0 | 1 | 3 | 3 | 2 |
| 21 | 19 | 14 | 3 | 0 | 2 | 0 | 0 | 2 | 3 | 0 | 0 | 3 | 0 | 5 |
| 38 | 21 | 1 | 0 | 0 | 0 | 0 | 0 | 0 | 2 | 0 | 1 | 1 | 0 | 1 |
| 66 | 11 | 7 | 0 | 0 | 0 | 0 | 0 | 0 | 2 | 1 | 0 | 3 | 6 | 8 |

MATRIX 11

| | | | | | | | | | | | | | | |
|---|---|---|---|---|---|---|---|---|---|---|---|---|---|---|
| 0 | 0 | 0 | 2 | 6 | 5 | 7 | 2 | 3 | 1 | 2 | 5 | 1 | 7 | 6 |
| 0 | 0 | 1 | 1 | 5 | 2 | 2 | 3 | 1 | 0 | 5 | 2 | 1 | 3 | 5 |
| 0 | 1 | 1 | 3 | 4 | 2 | 3 | 3 | 1 | 1 | 4 | 3 | 7 | 4 | 3 |
| 3 | 2 | 5 | 4 | 7 | 4 | 1 | 0 | 1 | 2 | 3 | 4 | 8 | 3 | 6 |
| 8 | 2 | 7 | 5 | 3 | 5 | 4 | 5 | 2 | 4 | 3 | 1 | 1 | 4 | 3 |
| 1 | 12 | 10 | 7 | 5 | 3 | 1 | 4 | 8 | 6 | 6 | 1 | 2 | 5 | 5 |
| 16 | 6 | 9 | 8 | 2 | 8 | 4 | 3 | 5 | 3 | 6 | 0 | 0 | 9 | 12 |
| 9 | 4 | 9 | 6 | 6 | 5 | 0 | 1 | 0 | 1 | 3 | 1 | 2 | 4 | 2 |
| 3 | 5 | 12 | 2 | 3 | 1 | 2 | 2 | 1 | 1 | 0 | 3 | 3 | 11 | 8 |
| 13 | 9 | 5 | 4 | 2 | 3 | 3 | 5 | 8 | 0 | 0 | 3 | 4 | 5 | 9 |
| 15 | 11 | 7 | 4 | 0 | 1 | 1 | 4 | 0 | 5 | 4 | 2 | 2 | 5 | 8 |
| 15 | 19 | 2 | 9 | 2 | 0 | 1 | 0 | 4 | 2 | 0 | 2 | 2 | 8 | 6 |
| 16 | 9 | 10 | 3 | 2 | 0 | 0 | 0 | 0 | 3 | 0 | 4 | 1 | 0 | 6 |
| 25 | 8 | 0 | 0 | 0 | 0 | 0 | 3 | 2 | 1 | 1 | 3 | 5 | 2 |
| 21 | 12 | 1 | 0 | 0 | 0 | 0 | 0 | 1 | 2 | 1 | 0 | 5 | 11 | 3 |

MATRIX 12

T5

| 0 | 0 | 1 | 2 | 6 | 5 | 1 | 3 | 5 | 1 | 6 | 4 | 0 | 10 | 14 |
| 0 | 0 | 2 | 5 | 7 | 2 | 0 | 3 | 4 | 1 | 2 | 4 | 2 | 1 | 2 |
| 2 | 2 | 2 | 3 | 5 | 2 | 3 | 2 | 0 | 1 | 6 | 6 | 4 | 8 | 4 |
| 1 | 2 | 1 | 2 | 5 | 5 | 6 | 4 | 0 | 4 | 2 | 4 | 6 | 7 | 3 |
| 3 | 7 | 4 | 5 | 6 | 6 | 2 | 7 | 7 | 1 | 0 | 5 | 1 | 3 | 3 |
| 4 | 7 | 2 | 6 | 5 | 0 | 7 | 3 | 6 | 4 | 6 | 0 | 5 | 7 | 7 |
| 10 | 13 | 4 | 6 | 1 | 8 | 2 | 2 | 0 | 3 | 8 | 2 | 5 | 5 | 9 |
| 5 | 7 | 4 | 5 | 4 | 7 | 3 | 1 | 0 | 4 | 4 | 4 | 2 | 4 | 7 |
| 4 | 8 | 8 | 5 | 0 | 2 | 0 | 3 | 4 | 0 | 2 | 3 | 6 | 11 | 8 |
| 8 | 6 | 10 | 2 | 5 | 7 | 6 | 5 | 4 | 2 | 1 | 6 | 11 | 3 | 7 |
| 13 | 6 | 7 | 0 | 5 | 3 | 2 | 3 | 0 | 1 | 1 | 2 | 0 | 6 | 16 |
| 9 | 11 | 7 | 3 | 0 | 0 | 1 | 0 | 3 | 3 | 1 | 1 | 3 | 12 | 2 |
| 14 | 8 | 4 | 0 | 0 | 0 | 0 | 0 | 1 | 2 | 4 | 6 | 1 | 1 | 7 |
| 32 | 10 | 0 | 0 | 0 | 0 | 0 | 0 | 2 | 0 | 3 | 0 | 4 | 4 | 1 |
| 19 | 8 | 0 | 0 | 0 | 0 | 0 | 0 | 1 | 2 | 2 | 4 | 4 | 5 | 2 |

MATRIX 13

T6

| 2 | 3 | 8 | 5 | 6 | 6 | 5 | 2 | 8 | 5 | 7 | 6 | 3 | 8 | 8 |
|---|---|---|---|---|---|---|---|---|---|---|---|---|---|---|
| 2 | 4 | 12 | 5 | 8 | 0 | 3 | 3 | 8 | 4 | 6 | 1 | 3 | 1 | 2 |
| 6 | 11 | 2 | 2 | 1 | 1 | 2 | 3 | 7 | 2 | 5 | 5 | 1 | 2 | 2 |
| 7 | 6 | 0 | 0 | 1 | 0 | 1 | 2 | 7 | 1 | 1 | 2 | 2 | 3 | 6 |
| 1 | 1 | 3 | 0 | 0 | 1 | 2 | 1 | 1 | 1 | 3 | 6 | 5 | 3 | 8 |
| 0 | 0 | 1 | 4 | 3 | 0 | 0 | 1 | 4 | 0 | 3 | 4 | 6 | 3 | 2 |
| 0 | 4 | 1 | 2 | 1 | 0 | 1 | 1 | 5 | 1 | 2 | 3 | 6 | 8 | 5 |
| 1 | 2 | 1 | 0 | 0 | 1 | 3 | 4 | 6 | 2 | 2 | 3 | 3 | 2 | 5 |
| 0 | 0 | 2 | 2 | 1 | 4 | 3 | 2 | 2 | 4 | 1 | 3 | 4 | 7 | 6 |
| 5 | 2 | 2 | 2 | 1 | 4 | 2 | 4 | 4 | 3 | 2 | 4 | 4 | 3 | 3 |
| 3 | 5 | 1 | 0 | 2 | 1 | 5 | 2 | 6 | 5 | 4 | 4 | 2 | 6 | 8 |
| 0 | 2 | 0 | 6 | 1 | 3 | 11 | 7 | 3 | 3 | 3 | 3 | 8 | 11 | 11 |
| 2 | 2 | 0 | 1 | 1 | 1 | 6 | 3 | 3 | 3 | 5 | 3 | 4 | 6 | 14 |
| 15 | 7 | 4 | 2 | 0 | 0 | 0 | 3 | 0 | 3 | 2 | 3 | 7 | 11 | 5 |
| 0 | 18 | 3 | 0 | 0 | 0 | 0 | 0 | 3 | 0 | 4 | 8 | 9 | 7 | 2 |

MATRIX 14

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 1 | 2 |
| 0 | 0 | 0 | 0 | 0 | 0 | 0 | 0 | 0 | 0 | 0 | 0 | 1 | 0 | 1 |
| 0 | 0 | 0 | 0 | 0 | 0 | 0 | 0 | 0 | 0 | 0 | 0 | 1 | 0 | 0 |
| 0 | 0 | 0 | 0 | 0 | 0 | 1 | 0 | 4 | 0 | 0 | 1 | 1 | 0 | 0 |
| 0 | 0 | 0 | 0 | 2 | 0 | 0 | 0 | 0 | 2 | 3 | 0 | 0 | 0 | 0 |
| 0 | 0 | 0 | 0 | 0 | 0 | 0 | 0 | 0 | 1 | 2 | 3 | 1 | 0 | 0 |
| 0 | 0 | 0 | 0 | 0 | 0 | 0 | 0 | 0 | 1 | 2 | 0 | 1 | 0 | 0 |
| 0 | 0 | 0 | 0 | 0 | 0 | 0 | 0 | 0 | 0 | 2 | 0 | 3 | 7 | 4 |
| 0 | 0 | 0 | 0 | 0 | 0 | 0 | 3 | 0 | 0 | 1 | 1 | 4 | 0 | 4 |
| 0 | 0 | 0 | 0 | 0 | 0 | 0 | 4 | 0 | 1 | 1 | 2 | 0 | 2 | 6 |
| 0 | 0 | 0 | 0 | 0 | 0 | 0 | 0 | 0 | 0 | 2 | 2 | 6 | 10 | 6 |

MATRIX 15

| 0 | 0 | 0 | 0 | 0 | 0 | 0 | 0 | 0 | 0 | 0 | 0 | 0 | 0 | 1 |
|---|---|---|---|---|---|---|---|---|---|---|---|---|---|---|
| 0 | 0 | 0 | 0 | 0 | 0 | 0 | 0 | 0 | 0 | 1 | 0 | 0 | 0 | 0 |
| 0 | 0 | 0 | 0 | 0 | 1 | 0 | 0 | 0 | 0 | 0 | 0 | 0 | 0 | 0 |
| 0 | 0 | 1 | 0 | 1 | 0 | 2 | 0 | 0 | 0 | 0 | 0 | 0 | 0 | 0 |
| 0 | 0 | 0 | 0 | 1 | 0 | 1 | 0 | 0 | 0 | 0 | 0 | 0 | 0 | 0 |
| 1 | 1 | 0 | 1 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1 | 0 | 1 | 2 | 0 |
| 0 | 0 | 0 | 1 | 0 | 1 | 0 | 0 | 1 | 3 | 0 | 1 | 0 | 1 | 0 |
| 0 | 0 | 0 | 0 | 1 | 0 | 0 | 0 | 1 | 2 | 3 | 1 | 1 | 0 | 1 |
| 0 | 0 | 0 | 1 | 0 | 1 | 0 | 0 | 0 | 0 | 0 | 1 | 2 | 0 | 0 |
| 0 | 0 | 0 | 1 | 2 | 0 | 0 | 0 | 0 | 0 | 0 | 1 | 0 | 0 | 0 |
| 0 | 1 | 1 | 1 | 0 | 3 | 0 | 1 | 0 | 0 | 0 | 0 | 0 | 0 | 0 |
| 0 | 0 | 1 | 0 | 2 | 0 | 2 | 0 | 1 | 0 | 0 | 0 | 0 | 0 | 1 |
| 4 | 1 | 7 | 0 | 0 | 1 | 0 | 0 | 0 | 0 | 0 | 0 | 0 | 1 | 1 |
| 0 | 17 | 4 | 7 | 4 | 0 | 0 | 0 | 0 | 0 | 0 | 0 | 0 | 0 | 0 |

MATRIX 16

| | | | | | | | | | | | | | | |
|---|---|---|---|---|---|---|---|---|---|---|---|---|---|---|
| 0 | 0 | 0 | 0 | 1 | 0 | 1 | 1 | 0 | 0 | 0 | 0 | 0 | 1 | 0 |
| 2 | 0 | 0 | 0 | 2 | 0 | 0 | 0 | 0 | 0 | 1 | 0 | 2 | 0 | 1 |
| 2 | 0 | 0 | 0 | 1 | 0 | 0 | 0 | 0 | 0 | 0 | 0 | 0 | 0 | 1 |
| 0 | 1 | 0 | 0 | 3 | 0 | 4 | 1 | 0 | 0 | 0 | 1 | 3 | 2 | 1 |
| 4 | 3 | 0 | 0 | 0 | 0 | 0 | 0 | 2 | 1 | 0 | 1 | 0 | 0 | 1 |
| 6 | 2 | 1 | 1 | 0 | 0 | 1 | 0 | 0 | 0 | 1 | 0 | 1 | 0 | 1 |
| 1 | 1 | 0 | 0 | 0 | 1 | 0 | 0 | 0 | 0 | 1 | 0 | 0 | 3 | 0 |
| 1 | 0 | 0 | 0 | 0 | 0 | 0 | 0 | 1 | 2 | 0 | 0 | 0 | 0 | 1 |
| 0 | 1 | 1 | 0 | 0 | 0 | 0 | 0 | 0 | 1 | 1 | 0 | 2 | 2 | 2 |
| 0 | 0 | 1 | 0 | 0 | 0 | 0 | 2 | 1 | 1 | 0 | 0 | 4 | 5 | 2 |
| 0 | 0 | 0 | 0 | 0 | 0 | 0 | 0 | 0 | 1 | 0 | 1 | 0 | 1 | 2 |
| 0 | 0 | 0 | 0 | 0 | 0 | 0 | 0 | 0 | 1 | 0 | 0 | 1 | 1 | 3 |
| 0 | 0 | 0 | 0 | 0 | 0 | 0 | 0 | 2 | 1 | 0 | 2 | 0 | 1 | 4 |
| 0 | 0 | 0 | 0 | 0 | 0 | 0 | 1 | 1 | 1 | 0 | 0 | 1 | 0 | 2 |
| 0 | 0 | 0 | 0 | 0 | 0 | 0 | 0 | 0 | 2 | 0 | 1 | 1 | 1 | 1 |

MATRIX 17

| 0 | 0 | 6 | 5 | 6 | 3 | 10 | 4 | 7 | 0 | 5 | 4 | 4 | 8 | 7 |
|---|---|---|---|---|---|---|---|---|---|---|---|---|---|---|
| 9 | 0 | 3 | 3 | 7 | 3 | 2 | 1 | 4 | 4 | 5 | 1 | 2 | 2 | 4 |
| 6 | 4 | 2 | 3 | 7 | 3 | 2 | 1 | 4 | 2 | 9 | 3 | 6 | 2 | 0 |
| 7 | 5 | 2 | 5 | 11 | 5 | 5 | 5 | 8 | 7 | 0 | 2 | 5 | 3 | 7 |
| 5 | 18 | 5 | 5 | 2 | 5 | 4 | 2 | 6 | 3 | 0 | 2 | 1 | 4 | 1 |
| 4 | 6 | 6 | 9 | 2 | 2 | 1 | 6 | 5 | 5 | 3 | 1 | 0 | 7 | 2 |
| 9 | 3 | 4 | 5 | 1 | 6 | 5 | 4 | 3 | 2 | 2 | 2 | 0 | 7 | 9 |
| 7 | 7 | 5 | 3 | 0 | 1 | 2 | 0 | 0 | 0 | 1 | 0 | 2 | 5 | 4 |
| 6 | 3 | 6 | 3 | 5 | 0 | 2 | 2 | 1 | 0 | 0 | 3 | 0 | 3 | 6 |
| 5 | 7 | 7 | 1 | 5 | 3 | 3 | 2 | 1 | 3 | 0 | 2 | 2 | 9 | 12 |
| 12 | 8 | 13 | 10 | 1 | 2 | 1 | 1 | 0 | 0 | 1 | 1 | 1 | 3 | 8 |
| 12 | 11 | 6 | 10 | 3 | 0 | 1 | 0 | 5 | 0 | 0 | 0 | 4 | 3 | 3 |
| 19 | 18 | 19 | 5 | 2 | 1 | 0 | 1 | 0 | 3 | 1 | 2 | 3 | 1 | 3 |
| 39 | 23 | 1 | 2 | 0 | 1 | 2 | 0 | 1 | 1 | 0 | 0 | 4 | 3 | 3 |
| 42 | 10 | 2 | 1 | 1 | 0 | 0 | 2 | 1 | 2 | 2 | 2 | 5 | 14 | 1 |

MATRIX 18

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 1 | 1 | 1 |
| 0 | 0 | 0 | 0 | 0 | 0 | 0 | 0 | 0 | 0 | 0 | 0 | 0 | 2 | 0 |
| 0 | 0 | 0 | 0 | 0 | 0 | 0 | 0 | 0 | 0 | 0 | 0 | 2 | 0 | 4 |
| 1 | 1 | 0 | 1 | 1 | 1 | 2 | 0 | 1 | 0 | 1 | 0 | 0 | 0 | 3 |
| 0 | 0 | 1 | 0 | 0 | 0 | 0 | 1 | 0 | 0 | 0 | 0 | 0 | 1 | 1 |
| 0 | 0 | 1 | 1 | 0 | 1 | 1 | 2 | 1 | 1 | 4 | 0 | 2 | 3 | 0 |
| 0 | 0 | 0 | 0 | 1 | 0 | 3 | 2 | 3 | 0 | 0 | 3 | 0 | 0 | 1 |
| 0 | 0 | 1 | 4 | 0 | 0 | 1 | 1 | 0 | 2 | 1 | 0 | 4 | 1 | 2 |
| 0 | 1 | 1 | 0 | 0 | 2 | 2 | 3 | 1 | 0 | 1 | 2 | 5 | 0 | 2 |
| 0 | 0 | 0 | 0 | 0 | 0 | 0 | 1 | 3 | 0 | 3 | 0 | 0 | 4 | 4 |
| 0 | 0 | 1 | 0 | 1 | 1 | 0 | 1 | 0 | 0 | 1 | 1 | 3 | 6 | 1 |
| 0 | 0 | 0 | 0 | 1 | 0 | 1 | 0 | 1 | 1 | 0 | 0 | 4 | 2 | 5 |
| 0 | 0 | 0 | 0 | 0 | 0 | 0 | 0 | 2 | 0 | 1 | 3 | 0 | 0 | 3 |
| 0 | 0 | 0 | 0 | 0 | 0 | 0 | 1 | 1 | 1 | 2 | 4 | 16 | 5 | |

MATRIX 19

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 1 | 1 |
| 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 1 | 1 | 0 |
| 0 | 0 | 0 | 0 | 0 | 0 | 0 | 0 | 0 | 0 | 0 | 0 | 0 | 0 | 0 |
| 1 | 0 | 0 | 0 | 1 | 1 | 1 | 0 | 0 | 1 | 0 | 0 | 0 | 0 | 0 |
| 0 | 0 | 1 | 0 | 0 | 0 | 1 | 0 | 1 | 0 | 0 | 0 | 2 | 0 | 0 |
| 1 | 1 | 0 | 0 | 1 | 0 | 0 | 1 | 1 | 1 | 1 | 0 | 0 | 0 | 0 |
| 0 | 0 | 0 | 0 | 0 | 0 | 0 | 0 | 0 | 0 | 0 | 0 | 0 | 0 | 1 |
| 0 | 0 | 0 | 0 | 0 | 2 | 0 | 1 | 1 | 0 | 0 | 1 | 0 | 0 | 0 |
| 0 | 0 | 0 | 0 | 0 | 0 | 0 | 1 | 0 | 0 | 1 | 0 | 0 | 1 | 1 |
| 0 | 0 | 0 | 0 | 0 | 0 | 0 | 0 | 0 | 0 | 1 | 0 | 1 | 0 | 4 |
| 0 | 0 | 0 | 0 | 0 | 0 | 0 | 0 | 0 | 0 | 0 | 0 | 0 | 2 | 3 |
| 0 | 0 | 0 | 0 | 0 | 0 | 0 | 0 | 0 | 0 | 0 | 1 | 0 | 7 | 1 |

MATRIX 20

```
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  0
0  0  0  0  0  0  0  0  0  0  0  0  0  0  1
0  0  0  0  0  0  0  0  0  0  0  0  0  0  0
0  0  0  0  0  0  0  0  0  0  0  0  0  0  0
0  0  0  0  0  0  0  1  0  0  0  1  0  0  0
0  0  0  0  0  0  0  0  0  1  0  0  0  0  0
0  0  0  0  0  0  0  0  0  0  0  1  0  0  0
0  0  0  0  0  0  0  0  0  0  0  0  0  0  0
0  0  0  0  0  0  0  0  0  0  0  0  0  0  1
0  0  0  0  0  0  0  0  0  0  1  0  0  0  1
0  0  0  0  0  0  0  0  0  0  2  0  2  1  3
0  0  0  0  0  0  0  0  0  0  1  0  0  7  1
```

MATRIX 21

| 0 | 0 | 0 | 0 | 0 | 1 | 0 | 1 | 0 | 0 | 0 | 0 | 2 | 1 | 1 |
|---|---|---|---|---|---|---|---|---|---|---|---|---|---|---|
| 0 | 0 | 0 | 0 | 0 | 0 | 0 | 0 | 0 | 0 | 0 | 0 | 0 | 1 | 3 |
| 0 | 0 | 0 | 0 | 2 | 2 | 0 | 0 | 0 | 0 | 0 | 3 | 0 | 2 | 5 |
| 0 | 0 | 0 | 1 | 1 | 0 | 0 | 0 | 0 | 0 | 0 | 0 | 2 | 5 | 5 |
| 0 | 0 | 1 | 3 | 3 | 1 | 1 | 0 | 0 | 2 | 1 | 1 | 8 | 3 | 11 |
| 0 | 0 | 1 | 0 | 2 | 1 | 3 | 2 | 2 | 1 | 1 | 2 | 3 | 2 | 3 |
| 0 | 0 | 3 | 0 | 0 | 3 | 0 | 1 | 5 | 1 | 3 | 2 | 4 | 3 | 1 |
| 0 | 0 | 0 | 1 | 0 | 0 | 2 | 4 | 12 | 4 | 6 | 10 | 2 | 0 | 3 |
| 1 | 0 | 1 | 0 | 6 | 4 | 6 | 2 | 2 | 11 | 10 | 1 | 3 | 5 | 2 |
| 0 | 0 | 0 | 3 | 2 | 4 | 2 | 1 | 1 | 2 | 10 | 4 | 8 | 1 | 4 |
| 0 | 0 | 0 | 0 | 0 | 2 | 3 | 0 | 8 | 1 | 7 | 2 | 4 | 6 | 6 |
| 0 | 4 | 6 | 2 | 6 | 6 | 8 | 3 | 0 | 4 | 5 | 4 | 5 | 4 | 8 |
| 0 | 0 | 2 | 2 | 8 | 7 | 15 | 5 | 2 | 3 | 6 | 2 | 8 | 8 | 21 |
| 0 | 1 | 13 | 10 | 8 | 12 | 16 | 11 | 4 | 1 | 3 | 5 | 2 | 24 | 7 |
| 0 | 12 | 5 | 14 | 9 | 9 | 9 | 7 | 11 | 6 | 7 | 8 | 14 | 15 | 10 |

MATRIX 22

| 13 | 5 | 7 | 1 | 1 | 3 | 1 | 2 | 5 | 13 | 6 | 3 | 5 | 4 | 3 |
|---|---|---|---|---|---|---|---|---|---|---|---|---|---|---|
| 4 | 7 | 4 | 3 | 5 | 0 | 1 | 2 | 1 | 1 | 2 | 8 | 1 | 1 | 4 |
| 0 | 2 | 0 | 1 | 0 | 0 | 1 | 1 | 5 | 0 | 0 | 1 | 3 | 6 | 6 |
| 1 | 0 | 1 | 1 | 2 | 0 | 2 | 0 | 1 | 0 | 1 | 2 | 3 | 4 | 6 |
| 4 | 0 | 0 | 1 | 0 | 0 | 1 | 1 | 1 | 1 | 1 | 2 | 4 | 3 | 6 |
| 8 | 1 | 1 | 1 | 0 | 1 | 3 | 0 | 0 | 3 | 3 | 5 | 2 | 2 | 3 |
| 0 | 0 | 0 | 1 | 0 | 2 | 2 | 1 | 2 | 5 | 2 | 4 | 11 | 7 | 3 |
| 1 | 1 | 0 | 1 | 1 | 1 | 3 | 2 | 8 | 2 | 2 | 4 | 7 | 5 | 4 |
| 0 | 0 | 0 | 1 | 2 | 6 | 8 | 7 | 8 | 5 | 7 | 2 | 1 | 3 | 1 |
| 0 | 0 | 1 | 1 | 0 | 3 | 1 | 3 | 2 | 4 | 4 | 6 | 9 | 7 | 2 |
| 0 | 0 | 0 | 2 | 1 | 4 | 3 | 1 | 5 | 3 | 4 | 6 | 3 | 6 | 9 |
| 4 | 2 | 5 | 0 | 6 | 9 | 19 | 8 | 0 | 3 | 7 | 5 | 10 | 9 | 9 |
| 1 | 1 | 0 | 4 | 6 | 9 | 12 | 8 | 5 | 2 | 6 | 4 | 7 | 6 | 9 |
| 1 | 1 | 5 | 9 | 11 | 19 | 25 | 17 | 8 | 0 | 2 | 2 | 9 | 14 | 10 |
| 2 | 7 | 6 | 7 | 14 | 19 | 23 | 8 | 5 | 3 | 3 | 9 | 10 | 27 | 9 |

MATRIX 23

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 1 | 0 | 0 |
| 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 1 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 0 | 1 | 1 |
| 0 | 0 | 0 | 0 | 0 | 0 | 0 | 0 | 0 | 0 | 0 | 0 | 0 | 0 | 1 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 2 |
| 0 | 0 | 0 | 0 | 0 | 0 | 0 | 0 | 0 | 0 | 1 | 1 | 2 | 7 | 1 |

MATRIX 24

| 0 | 0 | 0 | 0 | 0 | 0 | 0 | 0 | 0 | 0 | 0 | 0 | 0 | 0 | 1 |
|---|---|---|---|---|---|---|---|---|---|---|---|---|---|---|
| 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 2 | 4 |
| 0 | 0 | 0 | 0 | 0 | 0 | 0 | 0 | 0 | 0 | 0 | 0 | 2 | 0 | 8 |
| 0 | 0 | 0 | 0 | 1 | 0 | 1 | 0 | 0 | 0 | 0 | 0 | 21 | 6 | 12 |
| 0 | 0 | 0 | 0 | 0 | 0 | 0 | 0 | 0 | 1 | 2 | 5 | 10 | 3 | 6 |
| 0 | 0 | 0 | 1 | 1 | 0 | 2 | 1 | 6 | 7 | 0 | 8 | 5 | 2 | 2 |
| 0 | 0 | 1 | 0 | 2 | 9 | 8 | 3 | 61 | 4 | 2 | 16 | 4 | 0 | 1 |
| 0 | 0 | 1 | 3 | 2 | 3 | 9 | 10 | 8 | 12 | 7 | 2 | 11 | 1 | 0 |
| 0 | 1 | 0 | 2 | 1 | 10 | 0 | 3 | 0 | 2 | 23 | 20 | 8 | 2 | 4 |
| 3 | 3 | 4 | 1 | 11 | 3 | 7 | 9 | 27 | 10 | 6 | 4 | 5 | 10 | 4 |
| 0 | 6 | 5 | 3 | 18 | 20 | 29 | 14 | 0 | 5 | 25 | 6 | 5 | 18 | 22 |
| 1 | 2 | 2 | 20 | 15 | 20 | 18 | 34 | 4 | 0 | 5 | 8 | 11 | 17 | 29 |
| 22 | 17 | 86 | 71 | 210 | 46 | 150 | 190 | 8 | 7 | 11 | 13 | 8 | 28 | 10 |
| 1 | 67 | 62 | 170 | 190 | 230 | 420 | 13 | 22 | 4 | 19 | 13 | 25 | 33 | 17 |

MATRIX 25

W1

| 0 | 0 | 0 | 0 | 0 | 0 | 0 | 0 | 0 | 0 | 0 | 0 | 1 | 1 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 1 | 3 |
| 0 | 0 | 0 | 0 | 0 | 0 | 0 | 0 | 0 | 0 | 2 | 0 | 2 | 0 | 5 |
| 0 | 0 | 0 | 0 | 1 | 0 | 1 | 0 | 0 | 1 | 0 | 0 | 18 | 1 | 24 |
| 0 | 0 | 0 | 1 | 1 | 0 | 0 | 2 | 0 | 2 | 0 | 4 | 4 | 3 | 11 |
| 0 | 0 | 1 | 1 | 1 | 0 | 0 | 1 | 10 | 3 | 0 | 12 | 7 | 5 | 0 |
| 0 | 0 | 1 | 0 | 1 | 0 | 7 | 2 | 55 | 5 | 3 | 25 | 3 | 3 | 1 |
| 0 | 0 | 1 | 1 | 0 | 6 | 1 | 7 | 3 | 25 | 8 | 1 | 11 | 0 | 1 |
| 0 | 1 | 2 | 4 | 1 | 4 | 0 | 2 | 2 | 0 | 15 | 17 | 9 | 1 | 1 |
| 1 | 2 | 1 | 0 | 11 | 5 | 7 | 6 | 17 | 10 | 6 | 7 | 15 | 15 | 4 |
| 0 | 3 | 9 | 5 | 15 | 15 | 33 | 24 | 3 | 4 | 25 | 7 | 11 | 22 | 15 |
| 0 | 2 | 5 | 14 | 19 | 27 | 22 | 35 | 5 | 4 | 7 | 3 | 21 | 13 | 28 |
| 14 | 8 | 88 | 69 | 200 | 71 | 150 | 210 | 6 | 6 | 8 | 12 | 11 | 19 | 8 |
| 2 | 73 | 70 | 150 | 180 | 250 | 460 | 8 | 21 | 3 | 26 | 10 | 22 | 33 | 18 |

MATRIX 26

HIERARCHICAL DATA MATRIX PATTERN RECOGNITION SYSTEM

CROSS REFERENCE TO RELATED APPLICATION

This application is a continuation of application Ser. No. 08/814,473, filed Mar. 10, 1997 which is now U.S. Pat. No. 6,035,057 issued Mar. 7, 2000.

FIELD OF THE INVENTION

The present invention relates to a hierarchical artificial neural network (HANN) for automating the recognition and identification of patterns in data matrices.

BACKGROUND

The present invention was developed with a meteorological application. It has particular, although not exclusive, application to the identification of severe storm events (SSEs) from spatial precipitation patterns, derived from conventional volumetric radar imagery and will be discussed in that connection in the following. It is to be understood, however, that the invention has other applications as will be appreciated by those knowledgeable in the relevant arts. It may be applied wherever a pattern in a data matrix is to be recognized and identified, regardless of the orientation, position or scale of the pattern. One application of particular interest is in the analysis of multiple time frames of financial data series, for example stock prices and the like, where it provides a visualization in an n-dimensional space.

Severe storm events (SSEs) include tornadoes, downbursts (including macrobursts—damaging straight line winds caused by downbursts—wind shear, microbursts), large hail and heavy rains. These events, particularly tornadoes, may form quickly, vanish suddenly, and may leave behind great damage to property and life. It is therefore of importance to be able to provide some prediction and warning of the occurrence of these events.

Weather systems are known to be chaotic in behaviour. Indeed, chaos theory was originally introduced to describe unpredictability in meteorology. The equations that describe the temporal behaviour of weather systems are nonlinear and involve several variables. They are very sensitive to initial conditions. Small changes in initial conditions can yield vast differences in future states. This is often referred to as the "butterfly effect." Consequently, weather prediction is highly uncertain. This uncertainty is likely to be more pronounced when attempting to forecast severe storms, because their structure, intensity and morphology, are presented over a broad spectrum of spatial and temporal scales.

In a storm warning system, problems of prediction originate at the level of storm identification. The uncertainty in initial conditions manifests itself in two distinct forms:

(i) the internal precision and resolution of storm monitoring instruments; and (ii) the speed at which a storm can be pinpointed.

Furthermore, the recognition of storm patterns based on local observations is not always possible, since the patterns are inherently temporal in nature, with a sensitive dependence on previous states that may not have been observed.

Real-time recognition and identification of SSE patterns from weather radar imagery have been an instrumental component of operational storm alert systems, serving the military, aerospace, and civilian sectors since the early 1950's. This research theme continues to be among the most difficult, complex, and challenging issues confronting the meteorological community. While weather services around the globe have been improving methods of storm surveillance to facilitate the identification and forecasting of SSEs, the resulting increase in both the size and diversity of the resultant data fields have escalated the difficulty with assimilating and interpreting this information.

Factors at the heart of the problem include:

(i) The life cycle of SSEs is very short, in the order of 10 to 30 minutes. They are often of shorter duration than the opportunity to capture, dissect, and analyze the event on radar, let alone interpret the information.

(ii) Unlike real or physical entities, radar patterns do not manifest themselves in a life-like form, but are mere artifacts that resemble the type of reflectivity return expected from bona fide precipitation distributions accompanying SSEs. The relationship between SSEs and these abstractions is analogous to the correspondence between fire and smoke. Just like smoke can prevail after a fire ceases existence, so can a storm pattern be observed in the wake of a SSE. This time lag interferes with the perception of current conditions.

(iii) The features which do assist in the discrimination of SSE patterns rarely display themselves on a single radar image level, but are present at every level on a three dimensional grid. This complication is attributed to the fact that the severity of a storm is a function of buoyancy, the potential energy available to lift a parcel air and initiate convection. Since buoyancy is maximized during SSEs, the convective currents initiated give rise to non-uniform precipitation distributions at various altitudes. Furthermore, since feature structure (pattern boundaries) in the high dimensional data of radar imagery is usually quite sparse, most of the data is redundant. As such, it will likely require an extensive amount of visual processing to extract a sufficient number of features to secure class separability.

(iv) Distinctive SSE signatures: bow; line; hook; and (B)WER, have been universally accepted as indicators of specific storm features: squall lines; strong rotating updrafts; downbursts; and storm tilt. However, their tremendous spatial and temporal variability through translation, rotation, scale, intensity and structure, give rise to non-linear and multiple attendant mappings in the radar image domain, often resulting in two very different events being perceived as one and the same pattern.

(v) Often some of the most severe SSEs, tornadoes and macrobursts, do not visually present themselves on radar reflectivity (Z) imagery, since they occur in the virtual absence of precipitation. Any weak Z patterns displayed are usually buried in noise: radar clutter; side-lobe distortion; and range folding, causing subtle but distinguishing features to be obscured and overlooked.

(vi) The human brain is not conditioned to recognize SSE patterns. This is a complex task at least as difficult to learn as facial and object identification, and speech recognition.

As difficult as the human act of SSE recognition may seem, the more perplexing issue is to translate this process into the algorithmic and machine domain. To date, most approaches to this problem have relied on traditional artificial intelligence (AI) technology, with emphasis on two paradigms: (i) statistical methods; and (ii) artificial rule based experts. W. R. Moninger, "The Artificial Intelligence Shootout: A comparison of Severe Storm Forecasting Systems," Proc. 16th Conf. on Severe Local Storms, Kananaskis Park, Alta., Canada, Amer. Meteor. Soc., pp. 1–6, 1990 provides a comparative analysis of the implementation of such models in thunderstorm identification systems. K. C. Young, "Quantitative Results for Shootout-89," Proc. 16th Conf. on Severe Local Storms, Kananaskis Park, Alta., Canada, Amer. Meteor. Soc., pp. 112–115, 1990. elaborates on this study with some quantitative results.

These systems are unnatural in terms of their pattern encoding mechanisms. They make false assumptions about the underlying processes in question and require explicit knowledge, massive amounts of memory or extensive processing to encode, recall, and maintain information.

Statistical methods either make Gaussian assumptions or require a priori information about the underlying distribution of the pattern classes. Since there is insufficient information to fully express the relationships between radar patterns and SSEs, this technique produces unsatisfactory results.

Artificial experts, which rely on the use of explicit rules to emulate the qualitative reasoning and subjective analysis skills of a trained expert, are not appropriate because the nonlinear behaviour of SSEs gives rise to non-explicit descriptions of these relationships.

What is needed is a system that is capable of learning what it needs to know about a particular problem, without prior knowledge of an explicit solution, one which can be incrementally trained to extract and generate its own pattern features from exposure to real time quantitative radar data (stimuli). This type of system, commonly referred to as an artificial neural network (ANN) has been a focus of attention in the AI community for several years, but it was not until recently that ANNs have been applied successfully to solve real-world problems, such as speech recognition, three dimensional object identification and financial forecasting.

There are several other facets that make ANNs a very attractive approach for storm identification, namely, they:

(i) are inherently suited to function well in environments displaying chaotic behaviour (like the weather);

(ii) can excel at deriving complex decision regions in highly nonlinear and high dimensional data spaces (radar data);

(iii) are capable of generalizing the recognition of previous input patterns (in-sample) to new ones (out-of-sample);

(iv) can extract relevant features from an incomplete or distorted set of data—noisy returns from radar clutter, range folding, and side lobe distortion;

(v) can accelerate the coding of new information (relative to expert and statistical methods) by:

(a) adapting in response to changes in the environmental stimuli; and (b) allowing details of its structural connections to be specified by the network's input correlation history; and (vi) can process data distributively, making it possible to implement these systems in very high speed parallel computers.

McCann at the National Severe Storms Forecast Center was one of the first to demonstrate the effectiveness of ANNs in an operational storm alert system reported in D. W. McCann, "A Neural Network Short—Term Forecast of Significant Thunderstorms," Weather and Forecasting, Vol. 7, pp. 525–534, 1992. His research included both the training of two backpropagation ANNs (BPNs), to forecast significant thunderstorms from fields of surface-based lifted index and surface moisture convergence, as well as combining their results into a single hourly product, to enhance the meteorologist's pattern analysis skills. While this approach does not directly address the issue of identifying specific SSEs from high dimensional radar imagery, it is taken that the success of ANNs in a real-time storm environment depends on the computer power available to scale up from small networks and low-dimensional "toy" problems to massive networks of several thousands or millions of nodes and high-dimensional data. Other applications of ANNs in meteorology have also been limited to using low dimensional raw, unstructured data and a single BPN. These include:

Rainfall forecasting from satellite imagery in T. Chen and M. Takagi, "Rainfall Prediction of Geostationary Meteorological Satellite Images Using Artificial Neural Network," IGARSS, Vol. 2, pp. 1247–1249, 1993, and M. N. French, W. F. Krajewski, and R. R. Cuykendall, "Rainfall Forecasting in Time Using a Neural Network," Journal of Hydrology, Vol. 137, pp. 1–31, 1992;

The prediction of lightning strikes, and most recently, weather radar image prediction in K. Shinozawa, M. Fujii, and N. Sonehara, "A weather radar image prediction method in local parallel computation," Proc. of the Int. Conf. on Neural Networks, Vol. 7, pp. 4210–4215, 1994; and The diagnosis of tornadic and sever-weather-yielding storm-scale circulations in C. Marzban and G. J. Stumpf, "A Neural Network for the Diagnosis of Tornadic and Severe-weather-yielding Storm-scale Circulations," Submitted to the AMS 27th Conference on Radar Meteorology, Vail Colo.

Research reported in A. Langi, K. Ferens, W. Kinsner, T. Kect, and G. Sawatzky, "Intelligent Storm Identification System Using a Hierarchical Neural Network," WESCANEX '95, pp. 1–4, Nov. 30, 1994 and conducted in conjunction with the University of Manitoba (TR Labs), InfoMagnetics Technologies Corporation (IMT), and the Atmospheric Environment Services (AES) of Environment Canada, have demonstrated that by combining classical image processing with ANNs in a hierarchical configuration, there is no longer a need for scaling up to a massive single ANN when confronted with high dimensional data, such as radar imagery. Their approach decomposes the problem of storm identification into three levels of data processing:

1) dimensional reduction of CAPPI (constant altitude plan position indicator) radar images using data slicing, fragmentation, and classical preprocessing;

2) feature extraction and vector quantization in the form of learned codebooks using self-organizing feature maps (SOFM); and 3) pattern recognition and classification using a back-propagation network (BPN) as described in W. Kinsner, A. Indrayanto, and A. Langi, "A study of BP, CPN, and ART Neural Network Models," Proc. 12th Int. Conv. IEEE Eng. in Med. and Biology Soc., IEEE CH2936-3/90, Vol. 3, pp. 1471–1473, 1990.

The present invention relates to certain improvements in a system of this latter type. The present HANN storm identification system makes use of the processing stages of the prior art and incorporates additional levels of hierarchy with a more sophisticated and interactive engine of ANNs and training mechanisms.

The attributes which are most important in a real-time adaptive storm identification system include:

(i) Real-Time/High-Dimensional Data Processing

The surveillance of high-dimensional radar precipitation imagery (up to 481×481 pixels) on a continuous and short term basis ($\leq 5$ min.) demands that the system not only be capable of processing data of such magnitude, but also in a sufficiently short time to give the meteorologist the opportunity to observe the displayed pattern before the next radar signal is captured.

(ii) Non-Stationary/Real-Time Adaptable Knowledge Resource

Since SSEs are governed by air transfer mechanisms,—buoyancy, convection—which are nonstationary and unpredictable in nature, these variable characteristics are ultimately reflected in the radar image. Therefore, the system should be capable of continuously adapting to focus on those features in the radar images which are most prevalent in the dynamic environment. This requirement gives rise to the need for a self-stabilization mechanism in the system.

(iii) Self-Stabilization

With radar image sizes as large as 481×481 pixels, the number of permutations of SSE patterns that can potentially occur within the image space can exceed $10^{6 \times 10^5}$. The vast size of this space coupled with the inherent variability of SSE patterns can lead to temporal instability. When the number of inputs exceeds the internal storage capacity of the system, novel patterns can only be learned at the expense of destabilizing prior knowledge, eliminating previously learned patterns. Therefore, the tendency of the system to adapt to novel inputs must be either inhibited by a supervisor or self-stabilized to allow for the future encoding of arbitrarily many inputs of any complexity.

(iv) Compact Representation of Information Resource

Since the environment is constantly changing, there is insufficient opportunity to perform exhaustive information searches in the event that a demand forecast is requested. Therefore, the system should be capable of encoding information in a compact format to facilitate data retrieval and fast "best guess" approximations at any instant.

(v) Self-Organization

The subjectivity, uncertainty, and incompleteness of current SSE models, calls for a system that can self-organize its recognition code—a direct and unsupervised interaction with the input environment, which causes the system to adaptively assume a form that best represents the structure of the input vectors.

(vi) Data Abstraction/Noise Immunity

The system should be capable of extracting and recognizing relevant information from: (a) redundant data; (b) incompletely specified data e.g. data corrupted by noise; and (c) unspecifiable data which does not independently reflect the class to which it belongs. To prevent these artifacts from obscuring the effect of more distinguishing features, the system should employ models which are highly tolerant and immune to noise.

(vii) Nonlinear Behavior

The system should be capable of deriving arbitrarily complex decision regions in highly nonlinear data, because, many of the relationships describing the dynamic and spatial behavior between SSEs and attendant radar patterns, are subtle, non-explicit, non-linear, and at times chaotic.

(viii) Specialization and Generalization

The system should be capable of balancing its representation of the input environment, in terms of both local and global details. In a storm environment, there is a strong correlation between the presence of local SSE patterns on radar and the global structure of the complex in which they form. For example, the formation of a tornado is correlated with the spatial organization of hail and rain.

(xi) Ergonomic User Interface

The system should be capable of interacting with the user in an ergonomic fashion. The output produced by the system should be displayed in a consistent format that can be interpreted quickly, accurately, and reliably.

SUMMARY

According to one aspect of the present invention there is provided a method of processing plural object data matrices to identify known characteristic features therein, said method comprising:

A producing a trained self organizing feature space mapping by:
  i) providing a global set of training data matrices containing the characteristic features to be identified;
  ii) fragmenting each of the training data matrices into plural elements; and
  iii) processing each element of each training data matrix with a self organizing network to produce a trained self organizing feature space mapping; and B identifying the characteristic features in each of the object data matrices by:
  iv) fragmenting one of the object data matrices into plural object matrix elements;
  v) processing the object matrix elements with the SOFM to produce a feature characterization of the object data matrix;
  vi) processing the feature characterization to produce a density characterization of characteristic features in the object data matrix; and
  vii) repeating steps iv), v) and vi) for each of the object data matrices.

The self organizing network is preferably completely unsupervised. It may, under some circumstances include a supervised layer, but it must include at least an unsupervised component for the purposes of the invention.

The "self organizing feature space mapping" is intended to include any map with the self organizing characteristics of the Kohonen Self Organizing Feature Map.

The SOFM technique is the network of choice on a number of accounts. The SOFM has the remarkable ability to quantize a pattern space into homogeneous regions, while at the same time developing a faithful representation of neighborhood relations between pattern and feature space, in the absence of supervision. The unsupervised learning is of importance as part of the process, since pattern vectors derived from radar images during image slicing and fragmentation, may not independently represent the pattern event classes we are seeking to recognize and identify. Therefore, it is advantageous to use SOFMs first, as a means of quantizing the pattern vectors corresponding to all storm classes, and then to construct an abstract representation of each image based on the codebook developed by the SOFM. Since the image constructed will be utilized as a source of input to a classification network, it is desirable that the data be in a highly separable form, where the similarity measure used to map neighborhood relations from the pattern to feature space, conforms with the distance relations in the input of the classification network. This is not always possible, for strange patterns can exist or occur on occasion.

Ordering the vector components of the density maps in terms of their energy functions not only provides an ordered frequency distribution of the features present in the original radar image, but also provides a mechanism for perceiving different orientations, including translations, rotations and scales, of the same pattern as being similar. In addition, a frequency distribution display is well suited for distinguishing between different patterns. At this stage a frequency vector of a CAPPI image has been derived and this data abstraction can be displayed directly for examination. In preferred embodiments, it will be presented to a classification network for classifying the density vector representation of the three dimensional data and displaying a representation of classified features in the three dimensional data.

For classification, the standard counterpropagation network (CPN) network is inherently fast because it utilizes a competitive learning procedure in its first layer and simply a unity activation function in its output layer. In addition, since features corresponding to different classes and CAPPI images are able to undergo further feature extraction in the outstar layer, class separability can be improved prior to training the output layer.

According to another aspect of the present invention there is provided a method of training a counterpropagation network having an instar component comprising an input layer, a classification layer and an instar connection matrix joining the input layer to the classification layer, an outstar component comprising the classification layer, an output layer and an outstar connection matrix joining the classification layer to the output layer, a training layer, conscience means for distributing input data vectors amongst processing elements of the classification layer, and vigilance means for invoking additional processing elements in the classification layer, said method comprising:

a) initially inhibiting the vigilance means and activating the conscience means;

b) training the instar component towards equiprobability of distribution of input data vectors amongst the processing elements of the classification layer;

c) training the outstar component to converge an output vector towards a training vector;

d) monitoring an output error between the output vector and the training vector;

e) activating the vigilance means in response to the output error stabilizing at a level exceeding a predetermined threshold;

f) invoking a vigilance processing element in response to detection of a misclassified input vector;

g) inhibiting the vigilance means in response to the invocation of a vigilance processing element to prevent the invocation of further vigilance processing elements; and h) repeating steps b) to g) until the output error stabilizes at a level less than said predetermined threshold.

In preferred embodiments the predetermined threshold of the output error is reduced monotonically with time.

This provides a novel methodology for incorporating vigilance and conscience—mechanisms in the forward counterpropagation network during training.

BRIEF DESCRIPTION OF THE DRAWINGS

In the accompanying drawings, which illustrate an exemplary embodiment of the present invention.

Figure 5:
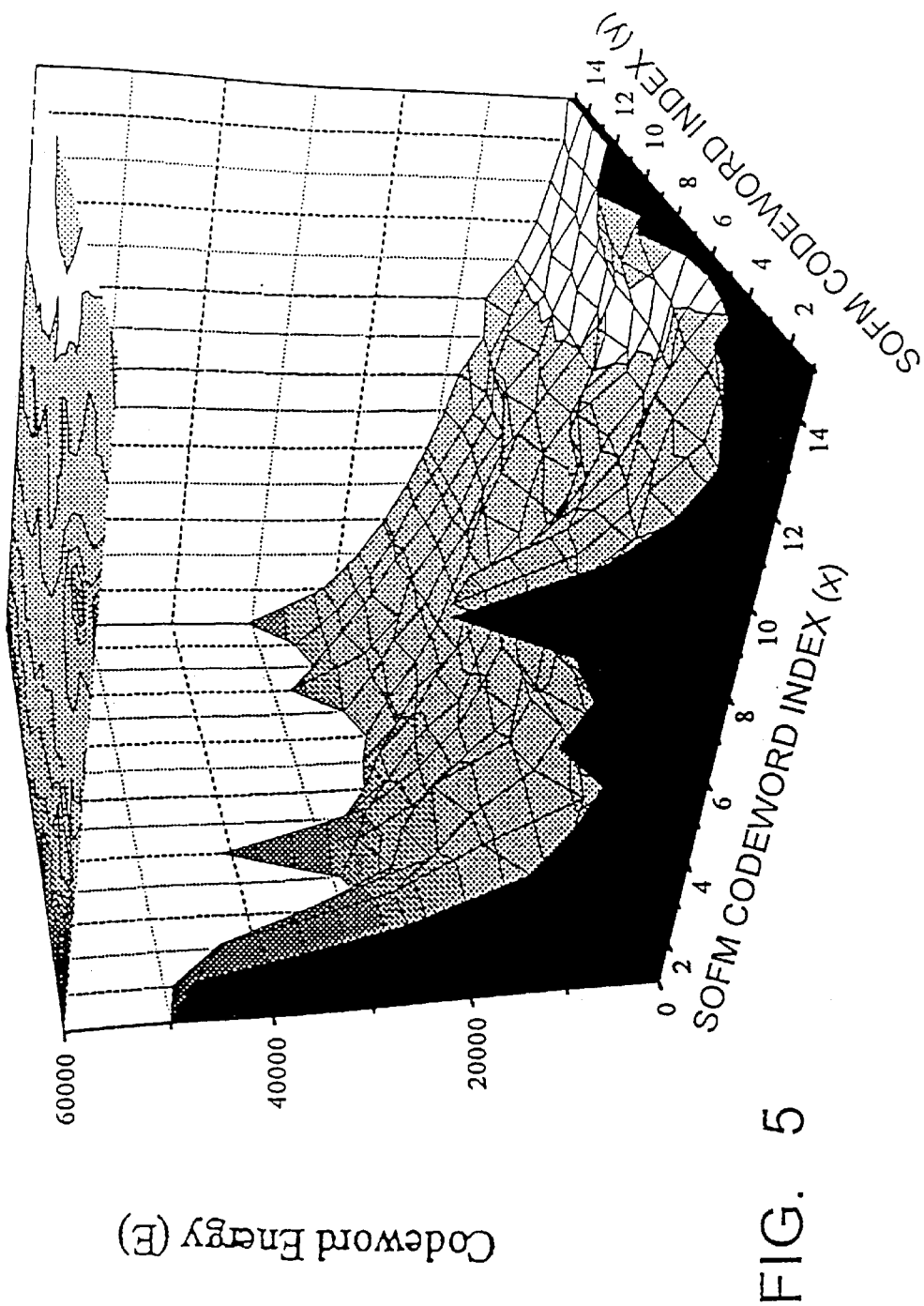
FIG. 5 shows the energy surface of an SOFM codebook.

Matrix 5 is the energy matrix plotted in FIG. 5;

FIGS. 6 to 27 are SODM contour maps generated in system training;

Matrices 6 to 27 are energy matrices corresponding to the maps of FIGS. 6 to 27.

DETAILED DESCRIPTION

Figure 1:
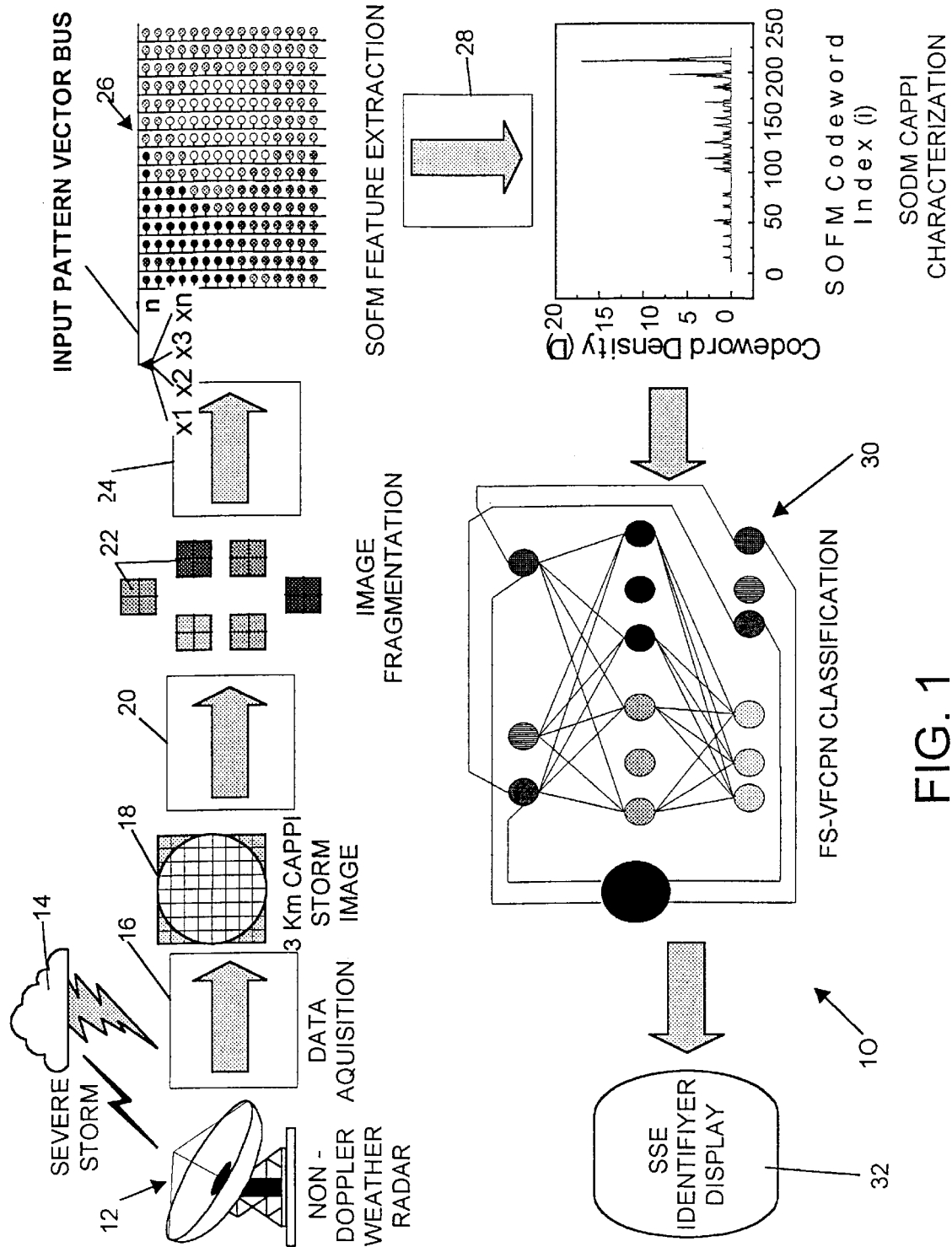
FIG. 1 is a block diagram of the storm identification system.

Referring to the accompanying drawings, FIG. 1 is a block diagram of the storm identification system 10. It has seven components, which communicate in a feedforward fashion to produce and process radar image data.

The first step is data acquisition. A non-Doppler weather radar antenna 12 scans for reflectivity patterns in a volume of the atmosphere occupied by a severe storm event (SSE) 14. From this raw data, a radar product processor (PP) 16 derives a set of constant altitude plan position indicator (CAPPI) images 18. The CAPPI images depict the precipitation distribution of the SSE at various altitudes.

Perceptual processing is performed in the following stage to prepare the images in a format suitable for classification. First, a processor 20 performs classical image fragmentation of the images to reduce the size of the data set. The CAPPI images are fragmented into equal sized blocks 22. A processor 24 then applies a thresholding scheme to discard blocks containing redundant information. The remaining blocks serve as inputs to a first ANN stage, where a SOFM feature extractor 26 associates a feature primitive for each block. A processor 28 derives a self organizing density map (SODM) characterization on the basis of the features extracted by the feature extractor 26.

A third processing stage is a second ANN stage that performs pattern classification. A FCPN 30 classifies the SODM characterization and associates a SSE identity for each CAPPI image on the basis of this classification. An SSE identifier display 32 displays the results in a format suitable for human analysis.

In use of the system, rather than transforming the entire three dimensional radar pattern onto a single SOFM map, separate SOFMs are trained to extract local features from only the most discriminating radar levels, the high (9 Km), mid (5 Km), and low (3 Km) altitude CAPPI images. This not only sensitizes the maps to become attuned to locally under-represented patterns of often critical importance, but also reduces the size of the map, and therefore, accelerates training.

At this point, each pattern vector is presented to each codebook for the respective altitude. The Euclidean energies of the codewords most similar to the pattern vectors are concatenated to form a multi-codebook distributive representation of all of the pattern vectors. A Euclidean energy function is utilized because it conforms with the distortion metric used to develop the neighborhood relations in the map, as well as providing a means for further quantization of the image space by reducing a high-dimensional pattern vector to a scalar value.

Once all pattern vectors belonging to a particular image have been presented to the SOFMs, the vector components are ordered in terms of their energy functions. This approach not only provides an ordered frequency distribution of the features present in the original radar image, but also provides a mechanism for perceiving different orientations of the same pattern as being similar. In addition, a frequency distribution display is well suited for distinguishing between different patterns. At this stage a frequency vector of a CAPPI image has been derived and this data abstraction will be presented to the classification network.

The CPN functions as a statistically near-optimal key-value lookup table and is capable of organizing itself to implement an approximation of a non-linear mapping of feature to classification space.

The standard CPN network is inherently fast because it utilizes a competitive learning procedure in its first layer and simply a unity activation function in its output layer. In addition, since features corresponding to different classes and CAPPI images are able to undergo further feature extraction in the outstar layer, class separability can be improved prior to training the output layer.

The CPN incorporates Hecht Neilson's interpolation [R. Hecht-Neilsen, "Applications of Counterpropagation Networks," Neural Networks, Vol. 1, No. 2, pp. 131–139, 1988], Wang's winning-weighted competitive learning (frequency-sensitive learning) [Z. Wang, "Winning-Weighted Competitive Learning: A Generalization of Kohonen Learning," Proc. of the Int. Joint Conf. on Neural Networks, Vol. 4, pp. 2452–2455, 1993] based on DeSinno's conscience mechanism[D. DeSieno, "Adding a Conscience to Competitive Learning,"], and Freisleben's Vigilance mechanism [B. Friesleben, "Pattern Classification with Vigilant Counterpropagation," Second Int. Conf. on Artificial Neural Networks, No. 349, pp. 252–256, November 1991] to provide a Vigilant feedforward CPN (V-FS-FCPN). This further enhances its generalization and resultant classification performance. It achieves equi-statistical representation of the feature mapping between all processing elements, while at the same time accelerating convergence. It also allows proper classification of storm patterns that have similar features but significantly different outputs.

A novel methodology is used for interfacing the vigilance and conscience mechanisms in a unified framework. During the self-organizing stages of the CPN network, when the Kohonen layer tries to develop an equiprobable representation of the feature space, the vigilance mechanism is inhibited and the conscience mechanism proceeds to establish equiprobability. Rather than heuristically determine when to initiate the vigilance mechanism after equiprobability and while the Grossberg layer begins to associate an output vector class with a given Kohonen codeword, the threshold of the vigilance mechanism is set to a high value initially, and it is monotonically reduced with time as Grossberg training progresses. Therefore, at the inception of training, when the output error is expected to be high, the vigilance mechanism prevents the inducement of new Kohonen and Grossberg vectors to accommodate the classification of strange patterns when the outputs of a select few patterns with similar inputs have significantly different outputs. As training progresses, the likelihood of an input pattern belonging to a specific class increases with time and therefore the vigilance threshold is decreased. The next time a pattern is presented, the conscience mechanism is obviously inhibited if a vigilance induced codeword is selected as a winner, since they do not conform to the general type of expected patterns. At this point the output of the Grossberg weight associated with this codeword is compared to the actual output of the training pattern presented, and similarly, if they differ by a value greater than the threshold, then once again a new codeword is grown. But, if they are somewhat similar, then the vigilance induced Kohonen and Grossberg codeword weights are pulled in the direction of the centroids of the actual training pattern values presented to that codeword over time. As a result, training speed is increased substantially as convergence of learning on those strange patterns reduces to a one-shot updating process.

Theory

A more detailed description of the theoretical basis of the invention is given in the following.

Object Data

Formally, object data can be represented as a set of n feature vectors, $x=[x_1, x_2, \ldots, x_n]^T$ in a p-dimensional feature space, $\Re^p$. The jth observed object datum, $x_j$ can be thought of as a numeric vector abstraction of some physical entity—in our case precipitation distributions of SSEs in one or more radar images. Each of these vectors comprise of p characteristics (features), which can represent the precipitation intensity of a single radar image pixel.

Feature Extraction

Feature extraction can be characterized mathematically as a transformation $\Phi$ of the set of all subsets (power set) in $\Re^p$: $P(\Re^p)$, to the power set of $\Re^q$: $P(\Re^q)$, with an image $y=\Phi(x) \in P(\Re^q)$. Although transformations of the form $p \geq q$ are sometimes desirable in applications where the original data space is too small to visualize feature structure, in our case, where the object space corresponding to radar data is much too vast, p is quantized to $q<<p$ (dimensional reduction) to reduce the space and time complexity of computations that make use of the extracted data.

While many ANN approaches to feature extraction are supervised (training with a priori knowledge of input class distributions), in many practical cases, we need to analyze and extract some information from a set of data, and classify them into several categories, while we do not know in advance what training samples are associated with each group. In such instances, we must rely on unsupervised learning techniques (training with incomplete knowledge of class distributions). The need for this approach in the context of this thesis will become self-evident in the System Architecture, when we explain why limitations in processor speed and memory capacity drives us to shift our classification decisions from known object classes in whole radar images to smaller, more localized regions of the data, whose object classes are unspecifiable in terms of truth data.

There are many traditional clustering methods, to wit, the K-means algorithm, however, these techniques are designed under some assumptions regarding the style of the class distributions. But, if the data population in question (SSE radar patterns) varies significantly, the clustering results can be completely meaningless. Therefore, it is difficult to select the most appropriate algorithm and to obtain the correct results. Unlike the previously mentioned models, the Kohonen self-organizing feature map (SOFM) can overcome these difficulties, because its self-organizing procedure is inherently unsupervised in nature [T. Kohonen, "The Self-Organizing Map," Proc. IEEE, Vol. 78, pp. 1464–1480, September 1990.].

Furthermore, in order for dimensional reduction to enhance classifier performance, it is imperative that the feature extraction technique eliminate redundancies without discarding the relevant feature primitives inherent in the original data. It is an equally important issue to select the most desirable property of x to preserve in $\Phi$, such that the transformation produces a characterization that is most suitable for subsequent processing (in our case, classification).

While one could maximize preservation of sample variance using principle component analysis or conserve inter-point distance pairs using the Sammon algorithm, the topology preserving property of the Kohonen self-organizing feature map (SOFM) is preferable on a number of accounts.

Self-Organizing Feature Maps

The SOFM has been applied successfully to a variety of image processing and pattern recognition problems: character, facial and speech recognition; feature space design; and vector quantization. In the present context, the focus on the SOFM will be in terms of its ability to quantize high-dimensional radar imagery into a smaller dimensional space, while at the same time extracting enough feature information to provide an invariant representation of each storm pattern.

The SOFM is advocated by many as a truly genuine ANN paradigm, in terms of two unique properties which are reminiscent of biological learning. The SOFM has the ability to facilitate the visualization and interpretation of complex clustering interrelations, feature structure and density population, in high dimensional spaces, by projecting these relations on to a lower dimensional viewing plane comprising a q-dimensional lattice of display cells $O_q \subset V(\Re^q)$, such that the shape of the distribution and the topological (spatial) order of the clusters, are near-optimally preserved. The SOFM is tolerant to very low accuracy in the representation of its signals and adaptive weights. These properties enable the SOFM to isolate the variability (inter/intra class) of noisy patterns, and consequently, makes it much simpler to assess the quality of the mapping.

The SOFM is also attractive from a number of other perspectives. The SOFMs generally converge at a faster rate than other unsupervised ANN models, performing a similar function. They have been shown to be convergent not only for a map with a high-dimensional lattice neighborhood but also for one on a simple two dimensional grid. Experimental results on numerous accounts have demonstrated the convergence to a reasonably optimal level on the basis of actual classification error rate performance.

The present discussion makes use of a two dimensional (m×m) viewing plane lattice $0_2 \subset V(\Re^2)$, because: (i) there is no practical advantage of visualizing data in a space containing more than 3 dimensions ($q \geq 3$); and (ii) the time complexity of feature extraction grows exponentially as the dimension of the map increases.

SOFM Network Structure

The SOFM can be implemented for this case through the network architecture described in the following section.

As shown above in FIG. 2, the SOFM comprises two structural components: (i) an input (fan-out) layer 34 consisting of p fan-out units 36 (grey circles) corresponding to each element of the input vector $x \in \Re^p$; and (ii) a competitive layer 38 made up of a linear array of $m^2$ neurons or processing elements 40 (PEs: black circles), that are logically associated with the display cell coordinates r=(i,j) in the m×m viewing plane lattice 42.

The medium for communication between the fanout and competitive layers is a synaptic connection matrix C, which forwardly links each fan-out unit 36 to all PEs 40 in the competitive layer 38. Each PE connection in C has an associated weight vector $v_r = [v_{r1}, v_{r2}, \ldots, v_{rp}]^T$ that is selectively adapted during training to become a prototype (codeword) of a specific input vector. Therefore, the SOFM comprises p parameter maps, one for each component of x. The set of $m^2$ $v_r$'s forms the weight matrix V, denoted by: $O_p = \{v_{ij}\} \subset \Re^p$. As depicted by the horizontal arrows between the competitive layer and the viewing plane in FIG. 2, there is a one-to-one correspondence between $O_p$ and the set of m×m display grid cells $O_2 = \{r\} \subset \Re^2$, in the sense that the reference set $\{1,2, \ldots m\} \times \{1,2, \ldots, m\}$ is both the logical address of the cell, and the geometric vector with coordinates r, center of the cell (i,j).

SOFM Training Procedure

The mechanisms and algorithm responsible for adjusting V are described in the following section.

There are two diametrically opposing forces at work during the SOFM training process, namely: (i) the weight vectors $v_r$ in $O_p$ become adaptively placed into the input space $\Re^p$, such that they assume a shape which approximates the probability density function of x (pdf(x)); and (ii) the self-organizing interaction among neighboring PEs in $O_2$ causes each PE to become a selective decoder of a specific cluster of input patterns, such that, the projection of $O_p$ onto $O_2$ preserves the topology and continuity of x. It is from this property that the network derives its identity, the self-organizing feature map.

The SOFM is trained using an iterative algorithm, comprising four basic steps. These are: (i) input selection and presentation; (ii) competition; (iii) adaptation; and (iv) evaluation for termination of training. To minimize the likelihood of PEs from becoming biased to a particular input pattern, V is typically initialized to small random values prior to training the network. Let t denote the current iteration.

The first step involves the appropriate selection (random or sequential ordering in accordance with the probability density function pdf(x) of the pattern space, $\Re^p$) of an input vector x, for presentation to the fan-out PEs 36, and ultimate distribution to each of the competitive PEs 40, through the connection matrix C.

In the second step, a competition is held among the competitive PEs 40, to determine which PE has an associated weight vector $v_r(t)$ in Op that lies nearest to x, in the sense of some minimum distortion metric in $\Re^p$. Denote the index of the winner's position on the viewing plane as $r_c = (i_c, j_c)$: the logical address of the prototype index $i_c = \arg_i \min\{\|x - v_i(t)\|\}$. Although the Euclidean metric is usually preferred as the measure of similarity because it is in direct correspondence with the side dimension of the map and the mathematical representation of energy, there are no constraints placed on the type of distance relation desired.

In order to make a cluster of PEs centred at $r_c$, detectors of the current input class, the following step rotates the weight vector components of the prototype $i_c \in [1, m^2]$ as well as those within a certain spatial neighborhood of $r_c$: $Nr_c(t)$, toward x, in accordance with the "short-cut" Kohonen learning rule: $v_i(t+1) = v_i(t) + h_{r_c i}(t)(x - v_i(t))$.

Two parameters are used to define $N_{r_c}(t)$. Its shape is typically represented as a hexagonal or square region in $O_2$. Its size covers the entire map initially as depicted by $N_{r_c}(t)$ (region in $O_2$ bounded by lightly shaded display cells in FIG. 2), and decreases monotonically with time a very narrow width $N_{r_c}(t+k)$ (region in $O_2$ bounded by darkly shaded display cells in FIG. 2). The lateral excitation coupling function $h_{r_c i}(t)$ expresses the strength of interaction between PEs at coordinate $r_c$ and i in $O_2$ (the degree to which the weight vector is pulled towards X) as a function of two variables: (i) time t; and (ii) the distance from $r_c$ to i∈i. A typical form for $h_{r_c i}(t)$ is Gaussian, and is defined as:

$$h_{r_c i}(t) = a(t)^{\left(-\|ri - rc\|^2 / \sigma(t)^2\right)},$$

where $\alpha(t) = \alpha(\alpha_f/\alpha_o)^{t/T}$ and $\sigma(t) = \sigma(\sigma_f/\sigma_o)^{t/T}$ are chosen as suitably monotonically decreasing functions of t. Therefore, $h_{r_c i}(t)$ decreases with t, and for fixed t, it decreases as the distance from i to r in $O_2$ increases. It has been demonstrated that the algorithm's performance is relatively insensitive to the actual choice of these two parameters and the manner in which they are decreased during the learning process. The combined effect of monotonically decreasing $N_{r_c}(t)$ and $h_{r_c i}(t)$ causes the map initially to induce a course spatial resolution (a rough global ordering of the weight vectors $v_r$) and gradually to allow a smooth transition to a finer resolution by preserving local order without destroying global relations.

The fourth and final step uses one of a combination of criterion functions to assess when training should be terminated. An extensive review of many papers on this subject indicate that the three most widely accepted criteria in practice are: (i) the decreasing lateral width of $N_{rc}(t)$; (ii) the diminishing rate of change of $V(i,t)$; and (iii) the distortion metric, D.

At the termination of training, a final pass is made through $\{X\}$, to obtain a display of its feature structure in $V(\Re^2)$. This display is typically produced by 'lighting up' (marking) each unit r in $O_2$ that corresponds with the PE $v_{rc} \subset O_p$, which is most similar to the current member of $\{X\}$ being passed. However, this technique breaks down when: (i) the number of clusters are unspecifiable before the algorithm is completed (as will be the case with radar images); and (ii) multiple inputs project onto the same position in the map.

A data visualization tool, known as self-organizing map (SOM) analysis, has been applied successfully to resolve these issues. An extension of SOM analysis which will be referred to as the self-organizing density map (SODM) is applied to: (i) visualize the density distribution of SOFM codewords corresponding to blocks elements in a single pattern vector (radar image); and (ii) construct a feature representation of whole radar images, for the purpose of classification. A description of SOM analysis will follow, to provide the preliminary material needed to formulate the SODM.

Experimental results demonstrate that SOM analysis is suitable for many different clustering problems and is considerably less dependent on assumptions regarding the distribution of data classes. Furthermore, it specifies the correct number of clusters on the map, and in cases where only limited a priori knowledge is available, its advantages are more pronounced.

Although SOFMs converge at a faster rate than most unsupervised learning models, the computational demand of the competitive process, the search for a nearest neighbor (NN) (the distance between the referenced weight vectors (test vectors) of all PEs and the current input stimuli), not only dominates the learning algorithm, but is also impractical when operating in an environment characterized by high-dimensional inputs, because the algorithmic complexity of conventional brute-force NN-search methods increases exponentially with both the dimension of the data space and the size of the map needed to accommodate the cardinality of the training set. Therefore, if the application of the SOFM is to be practical, in terms of extracting features from high-dimensional radar data, then it is essential that a mechanism be incorporated to deal with this problem.

The issue of accelerating the information encoding training process has been addressed implicitly from the standpoint of improving the utilization of weights in the map: conscience and orphan learning; chaotic versus linear activation functions, and also adding a momentum term to the learning rule, similar to that of backpropagation (BP). The benefit of these techniques in terms of the recall process is not addressed. Since NN-searches need to be performed repetitively, both during the encoding and recall stages, it is desirable to resolve the issue by applying a fast NN-search mechanism. For present purposes, the probing algorithm has been adopted.

The probing algorithm is capable of achieving a significant training speed gain, when operating on input spaces larger than 16 dimensions. The probing algorithm can effectively achieve a 6 to 10 fold reduction in training time, by exploiting the properties of self-organization and topological preservation inherent in the SOFM. Furthermore, the average complexity of the algorithm and the effective size of the search space decreases as the size of the input space increases. Therefore, if the cardinality and/or dimensionality of the training set needs to be expanded in the future, this algorithm will not adversely effect the SOFMs training speed. The mechanics of this algorithm are described in the following.

Probing Algorithm

The probing algorithm is a stochastic, iterative process, which comprises two steps. Given a set of reference vectors $\{vr\}$, it:

(i) searches for the NN to a test point, x (candidate) with any algorithm in a predetermined number of steps (typically 2–6 steps). Each step consists of: (a) computing the distance ($\|v_r-x\|$) to the test point; and (b) comparing the computed distance with the current minimum distance.

(ii) navigates or "probes" around the lattice neighborhood region of the current candidate to find the NN, and if the region contains better candidates, then the best of them (winner) is selected, otherwise, the search is terminated.

Figure 2:
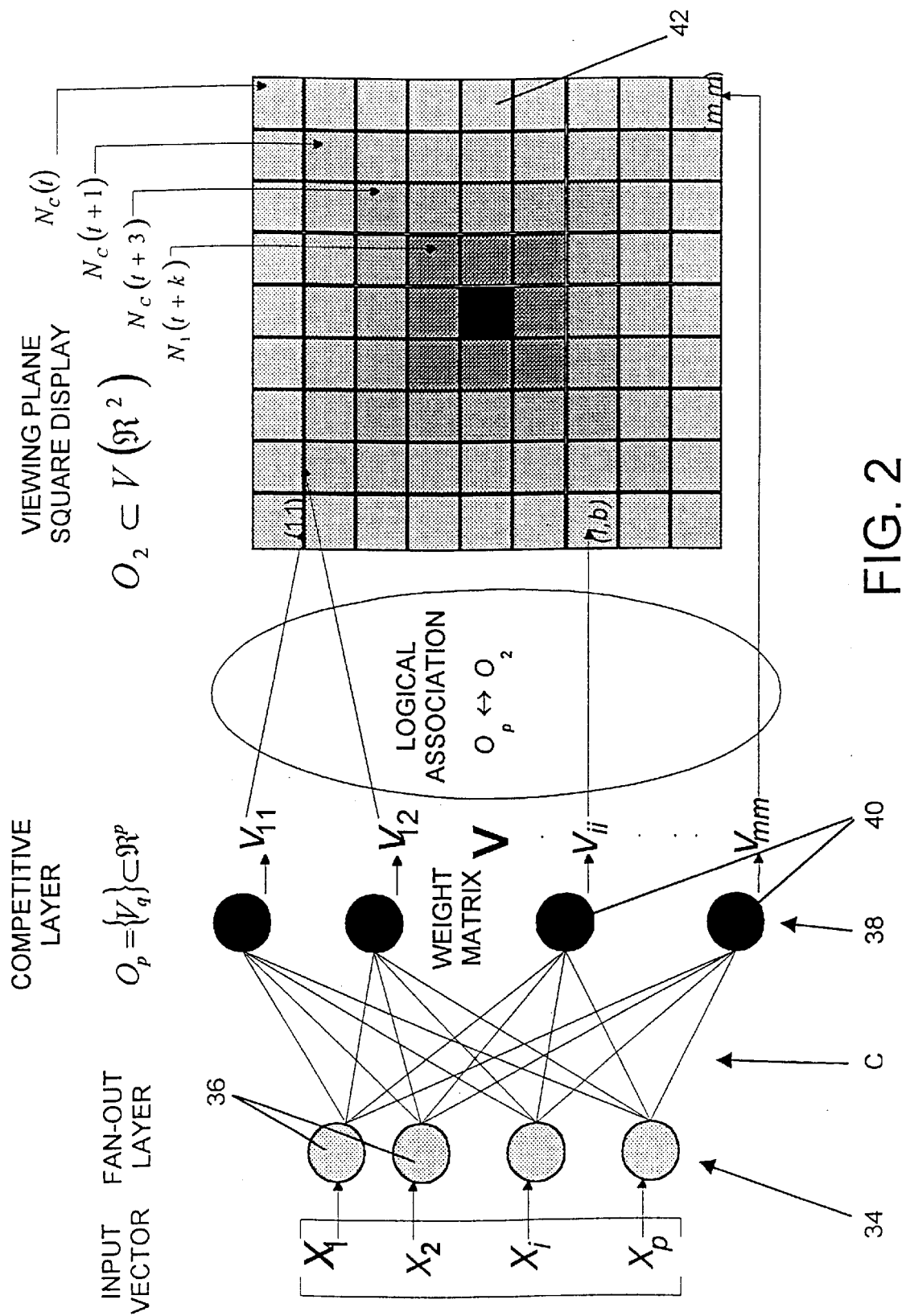
FIG. 2 is a schematic diagram of the SOFM.
Figure 3:
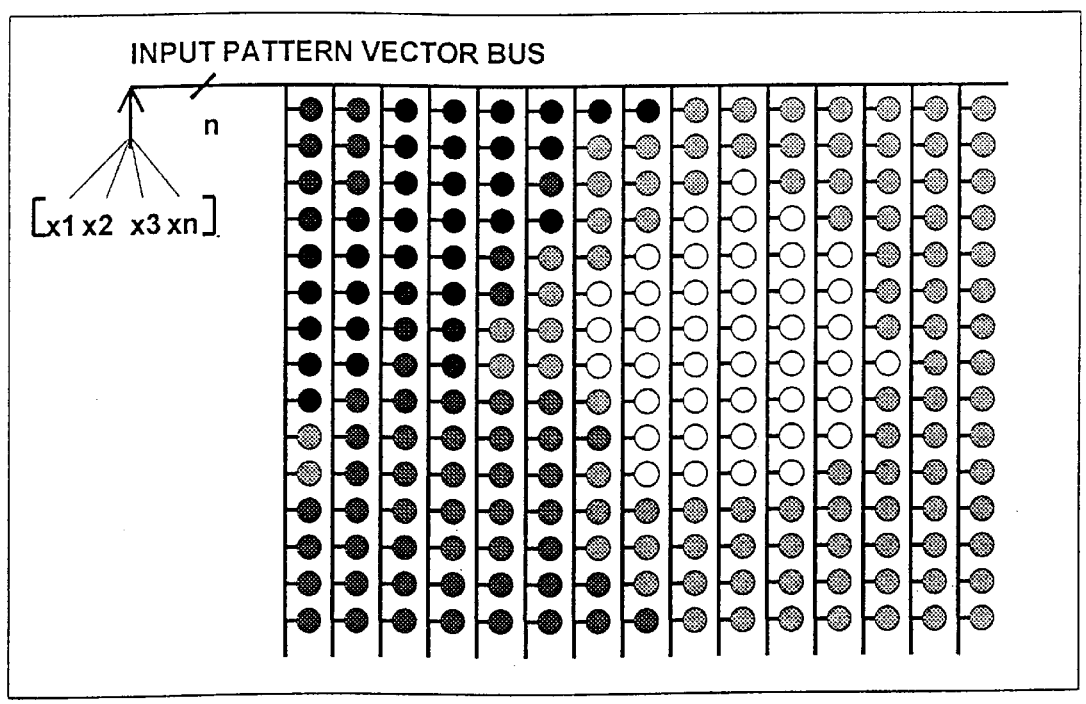
FIG. 3 is an illustration of the structure of the Kohonen self organizing map.

The preliminary search in stage (i) uses the basic Friedman algorithm [J. H. Friedman, F. Basket, and L. J. Shustek, "An Algorithm for Finding Nearest Neighbors," IEEE Trans. Comput., Vol. C-24, pp. 1000–1006, October 1975.] The reference vectors are ordered periodically during training, with respect to their projection values on a cyclically selected coordinate axis (each axis selected in turn), as shown in FIG. 2. This stochastic selection injects another source of non-deterministic behaviour in the SOFM. The smallest projected distance from the test point is then selected as the first candidate for the NN, and its vector distance (Euclidean) from the test point becomes the "current candidate" for the minimum distance. The remaining reference vectors are now examined in order of their projected distance, and if the minimum of their set of vector distances is smaller than the "current candidate," then the reference vector corresponding to this minimum is chosen as the "next candidate." The search is terminated when the first local minimum is found, when the vector distance between the "next candidate" and the test point, becomes larger than that of the "current candidate."

Although the full Friedman procedure, which orders reference vectors on all of the coordinate axes and selects the one with the smallest local projected density in the neighborhood of the test point for searching, provides a more accurate approximation of the NN, this approach is not used, because in spaces greater than 14 dimensions the computational demands are excessive.

Since stage (ii) of the algorithm is based on the smooth topology of the map, with neighborhood relations among the reference vectors induced by the lattice of corresponding PEs, it is essential for the map to be roughly organized prior to initiating the procedure. Therefore, the exact NN-search method is used for the first few iterations of training.

Now that the procedure has been described, the reason why this algorithm functions so effectively will now be explained.

At the inception of training, while the map is in a relatively disorganized state, the Friedman search will have a higher probability of getting trapped in a local minimum, and consequently, a higher error rate at finding the NN. This problem is further pronounced when the inputs are very large (more than sixteen dimensions), because more folding is required to fit a two dimensional map into a higher dimensional space. However, the error rate does not have a significant effect on the performance. With nc(t) quite large during the initial stages of training, the fold causes the local minimum to migrate towards the minimum and eventually smooth out. Since errors (local minima) in finding the closest reference vector to an input pattern occur systematically at the same locations on the map, they assume an alternative mapping from the input space onto the lattice, which projects a test point and its neighborhood on the same PE (without disturbing self-organization). Although the error probability of finding the exact NN by the Probing algorithm is quite high (17%), the classification error rate is considerably lower (9.2%). This is consistent with the inherent tolerance of the map to very low accuracy in the representation of its signals and adaptive weights.

Forward Counterpropagation Network

The FCPN network functions as a self-adaptive, near-optimal key-value lookup table in the sense that key entries in the table are statistically equiprobable approximations of a continuous mathematical mapping function, $\psi: X \in \Re^n \rightarrow Y \in \Re^M$. The objective function is to learn the intrinsic relationships between feature structure (SODM characterizations) in precipitation imagery and observed SSE events (classes). The network becomes attuned to this mapping through adaptation in response to training exemplars, $(x_\omega, y_\omega)$; $\omega \in [1, \Omega]$ of the mapping's action. An overview of the network's structure and signal flow follows.

FCPN Network Structure

Figure 4:
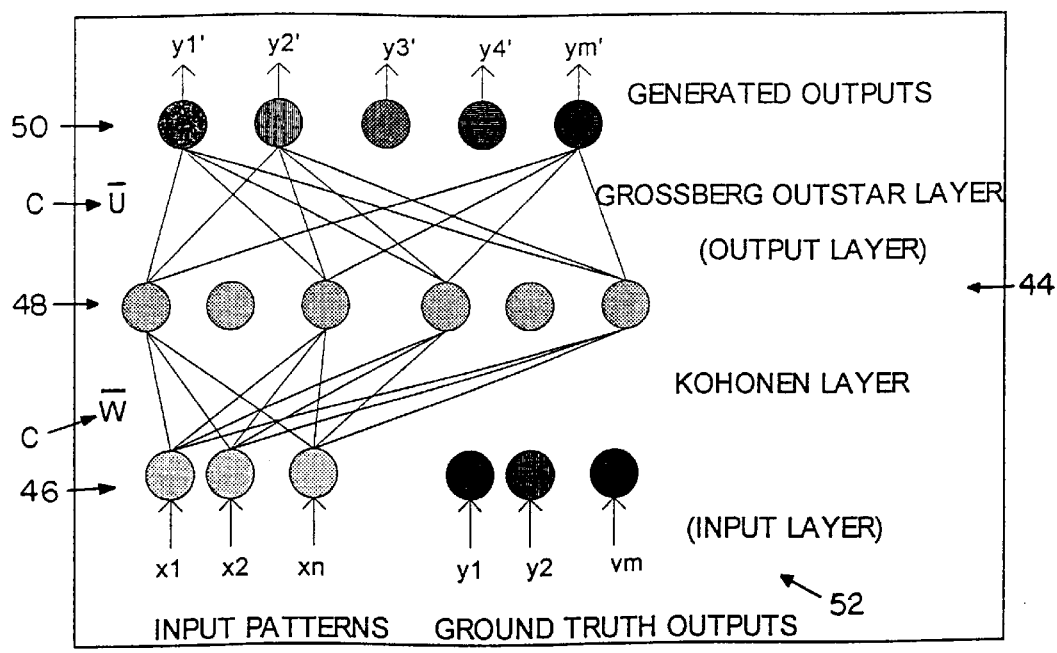
FIG. 4 illustrates the structure of the FCPN.

The FCPN is a hybrid structure, having four basic components, as shown in FIG. 4. These include: an input layer consisting of n fanout units; a SOFM classification layer (K-Layer) made up of a linear array of N instar PEs; a Grossberg identification layer (G-Layer) containing M outstar (output) PEs; and a training layer, consisting of M training PEs. The medium for communication between each processing layer is a synaptic connection matrix, C which forwardly links each PE in a given layer to every PE in the following layer in a fully connected topology. The inward pointing connections from the n fanout units to the ith K-layer PE forms an instar topology, which has an associated adaptive weight vector, $w_i = [w_{i1}, w_{i2}, \ldots, w_{ij}, \ldots, w_{in}]$; $i \in [1, N]$, $j \in [1, n]$. The outward pointing connections from each of the N instar PEs to the M G-layer PEs forms a set of outstar structures, which have an associated set of adaptive weight vectors, $u_k = [u_{k1}, u_{k2}, \ldots, u_{kj}, \ldots, u_{kn}]$; $k \in [1, M]$, $j \in [1, N]$. These vectors make up the K-layer and G-layer weight matrices, $\overline{W}$ and $\overline{U}$, respectively.

The ith fan-out unit receives the ith component of an external input vector (key-entry stimuli), $x_\omega = [x_{\omega 1}, x_{\omega 2}, \ldots, x_{\omega j}, \ldots, x_{\omega n}]$; $j \in [1, n]$, and multiplexes (distributes) this scalar value to each instar PE. The ith instar PE produces a scalar activation signal, $z_i$; $i \in [1, N]$, and propagates this value to each outstar PE. The kth training PE receives the kth component of the training vector (desired output vector), $y_\omega = [y_{\omega 1}, y_{\omega 2}, \ldots, y_{\omega k}, \ldots, y_{\omega M}]$; $k \in [1, M]$ and sends this value to the kth outstar PE. The kth outstar then generates its output mapping approximation (lookup table value), $y_k'$; $k \in [1, M]$ on the basis of the $z_j$ and training signals.

FCPN Training Procedure

The instar and outstar structures complement each other in a two stage training process to learn the desired mapping function. First, the instar PEs are given "perceptual skills" by nurturing them to recognize different regions of the input space $\Re^n$ that are representative of specific input clusters. Second, the outstar PEs are given "associative skills" by training them to assign an identity to the selected cluster. The standard FCPN network imposes a number of constraints on the mapping. The correspondence between input and output vectors should be continuous. A group of input vectors that are spatially close together relative to other vectors in $\Re^n$ forms a cluster region which is representative of a distinct class. The training set should be statistically representative of the mapping domain. The second constraint does not preclude multiple instar PEs from sharing a common class.

Instar Encoding Mechanisms and Training Algorithms

Individual instar PEs become conditioned to input vectors of a single cluster through a mechanism known as stochastic competitive unsupervised learning. Stochastic refers to the random selection of training exemplars, competitive relates to the process through which individual instar PEs compete for excitation to input stimuli, and unsupervised implies that learning is a self-organizing process that does not require reinforcement or graded training from an external supervisor.

The objective of competitive instar learning is to encode adaptively a quantization of the input vector space $\Re^n$ into N Voronoi regions (Pattern clusters), $V_i(w_i) = \{x \in \Re^n: d(x, w_i) \leq d(x, w_j); j \neq i\}$; $i \in [1, N]$, such that the partition property, $\Re^n = V_1 \cup V_2 \cup \ldots \cup V_i \cup V_N$; $V_i \cap V_j = 0$; $i \neq j$, self-organizes and distributes the instar weight vectors $w_i$ in $\Re^n$, to approximate the unknown probability density function $\rho(x)$ of the stochastic input vectors, x. In other words, the instar layer is said to have learned the classification of any input vector in $\Re^n$, when each of the i instar PEs responds maximally for any given input in $V_i$. Therefore, the training exemplars should be statistically representative of the input mapping domain. However, a novel method has been derived from vigilance and conscience learning to minimize the degradation of quantization accuracy when lifting this constraint.

As in the SOFM, the FCPN network uses a variant of Kohonen learning to minimize the average quantization distortion of the instar weight vectors, wi. This objective can be accomplished using the following sequence of training steps.

As in the SOFM, the $w_{ij}$s are initialized to small random values prior to training. First, a pattern vector $x_w$ is selected randomly from the training set in accordance with its pdf, and is then presented to the fan-out layer, which distributes x through the instar weight matrix W. A competition is held among every PE in this layer, to determine which PE has a $w_{ij}$ most similar to x. Typically, a Minkowski distance metric of order 2 (Euclidean norm) is used as the measure of similarity. At this stage, it is assumed that all instar activation signals $z_i$ are initialized to zero. The PE that is most similar is declared the "winner," and its activation signal is set to unity ("1"). The $z_i$s are then used to specify which $w_{ij}$s need to be adapted, in accordance with the training rule. As in the SOFM, $(x_{wj} - w_{ij})$ represents the scalar error between x and w, and a(t) denotes the training rate. The degree to which the error is corrected decreases monotonically with time in the range from unity to zero. Since $z_i$ multiplies the correction signal $a(t)(x_{wj} - w_{ij})$. only the winner ($z_i = 1$) will be updated (unless there is absolutely no error between a and w). After many presentations of the training set X, the adaptation rule causes the instar PEs to spread into those regions of the input space in which training exemplars occur and ultimately carve out a decision region that corresponds to the region of the input space in which all input vectors are closer to a particular PE than any other. But, since no mechanism is built into the adaptation rule to ensure that the distribution of instar PEs are equiprobable with a weight distribution which is partitioned into Voronoi regions of relatively equal sizes and weight vectors which spread across input clusters with equal frequency, an additional mechanism, known as "conscience", is incorporated in the instar learning algorithm to resolve this issue.

Outstar Encoding Mechanisms and Training Algorithm

The behaviour of the outstar PEs resembles classical Pavlovian conditioning in terms of Hebbian learning.

During the conditioning period, the winner of the competition in the instar layer propagates its activation signals $z_i$ through the connection matrix C, providing a single conditioned stimulus (CS) $z_i$ to one of the outstar PEs. At the same time, an unconditioned (supervised) stimulus (UCS) $y_\omega$ from the training layer is supplied to the outstar PEs. Since the objective function of the outstar layer is to make the network learn the correct lookup value (target value) y=ψ (x), the outstar weight matrix $\overline{U}$ is adjusted such that the unconditioned response (UCR) is pulled towards y (within a constant multiplicative factor). Once conditioning is complete, the presence of the CS (triggered by x) alone (UCS=0) should be able to produce a conditioned response (CR) y'=ψ($\omega_i$) that adequately approximates y=ψ(x)(without exciting any of the other outstar PEs).

The conditioning scheme described above can be accomplished by applying the Grossberg learning rule. Once again, the degree to which the error is corrected decreases monotonically with time in the range from unity to zero. The output vector components $y_k'$ of the kth outstar PE is generated by taking the vector dot product of its weight vector $v_{kj}$ with the $z_j$s produced by the instar PEs. Since only the winning instar PE produces a non-zero activation ($z_j$=1), y' reduces to nothing more than the outstar vector $u_{jk}$ associated with the winning PE.

While the form of the learning rule may appear similar to that of the instar layer, its effect is very different, in the sense that the $u_i$s of each outstar PE converge to the statistical averages of the training vectors y associated with the input exemplars x that activated the corresponding instar PEs. Since the $w_i$'s tend toward an equiprobable state during instar training, the outstar PEs are also equiprobable in the sense that they take on values that are on average best representative of the lookup value in each training case. Therefore, the FCPN network functions as a statistically near optimal key-value lookup table.

Although the FCPN is both simple and powerful in its operation as a mapping network, there are pitfalls in its basic design and training algorithm that can impede its performance, especially when classifying SSEs. These include: a difficulty with establishing and maintaining equiprobability of Kohonen weight vectors; sub-optimal mapping approximation accuracy and generalization performance, especially when training on small data sets with a high degree of variability; and a failure to distinguish between similar patterns in the metric sense, which have significantly different outputs. These problems are discussed in the following.

Randomly selected input vectors from high-dimensional spaces, such as radar imagery, are typically orthogonal. Additionally, input vectors are likely to cluster into various regions with different frequencies, e.g. in isolated regions of space. It is therefore possible that the random configuration of the initial weight matrix W to be such that only a limited number of weight vectors migrate toward the vicinity of the inputs. If such a condition were to prevail, then independently of which input pattern is presented, only a few or even single instar PE(s) would win the competition and have their weight vectors move toward the centroid of those patterns. All other weight vectors would remain "stuck" in their initial positions. Consequently, the network would be grossly under-utilized, and would only learn to distinguish among a few isolated input classes.

Since input vectors emanating from weather radar can be non-stationary in nature, the distribution of vectors from each class can change with time, and cause those few classes that were originally coded by the instar PEs, to get recoded (destabilized) during the course of training to represent other classes, at the expense of forgetting the original data. The use of such a network in an operational storm environment would lead to unacceptable classification errors.

Conscience Learning

To cope with difficulties discussed above, conscience learning is incorporated into the HANN. The essence of conscience learning is to provide each instar PE with an equal opportunity to win the competition, so as to achieve an equiprobable distribution of instar weights, and consequently a more balanced representation of the input vectors. This is accomplished by instilling within each instar PE a "conscience", such that, the more frequently it wins the competition than other instar PEs (>1/N), it has a tendency to shut down and unstick "stuck vectors" by allowing other PEs to win. The mechanism used to implement this competitive process is based on Wang's extension of DeSinno's "winning weighted distortion measure" [Z. Wang, "Winning-Weighted Competitive Learning: A Generalization of Kohonen Learning," Proc. of the Int. Joint Conf. on Neural Networks, Vol. 4, pp. 2452–2455, 1993].

While the simple "winner take all" strategy of the standard FCPN network is suitable for classification problems requiring little generalization, when mappings are relatively simple and rigid, this approach becomes highly inadequate when training on complex mappings, especially if little training data is available. This strategy imposes a constraint on the ability of the network to generalize, because it becomes inherently quantized to N levels, the number of Kohonen neurons in the competitive layer. Consequently, the mapping accuracy of the network can only be improved at the expense of increasing the number of Kohonen neurons. However, simply increasing the number of available neurons to accommodate additional input classes may actually aggravate/exacerbate the problem by forcing the neurons to memorize, instead of generalize. To increase the mapping approximation accuracy and the balance between generalization and specialization performance, an interpolation mechanism may be used.

The primary objective of this mechanism is to enable the network to function as a multiclass Bayesian Classifier. This is accomplished by allowing a blending of multiple network outputs. The most effective method for partitioning the unit output signals is derived from Barycentric calculus, originating from the works of mathematician August Mobius in 1827.

Vigilance Mechanism

Although it is usually advantageous for a multi-layer neural network, in the present case the FCPN network, to form a continuous mapping of a feature space to a classification space, there are situations and, in the context of SSE identification, critical instances, where this type of projection process would fail. This may occur for example, when two similar SSE features project onto two distinct SSE classes, e.g. a life threatening tornado and non life-threatening heavy rain. Although measures are taken to ensure that the feature space established during self-organization is separable, there may be occasions where patterns appear similar in the metric sense by stimulating the same neurons in the instar layer, but represent different output classes. The standard FCPN network would merely map these features onto the same Kohonen neuron, and subsequently gravitate the Grossberg weights associated with the Kohonen neuron in the direction of the fading window centroid of the class outputs associated with these features. But, when two distinct output classes are represented as a binary vector, the centroid is no longer representative of either class, resulting in a large and possibly significant network error. This problem can be avoided by invoking an additional neuron in the FCPN, known as the vigilance unit, to monitor, evaluate, and control the quality of the network output during the training phase. The application of this mechanism in the FCPN network was originally proposed in O. Seipp, "Competition and Competitive Learning in Neural Networks," Master's thesis, Dept. of Computer Science, University of Darmstadt, Germany, 1991, and investigated by Friesleben in B. Friesleben, "Pattern Classification with Vigilant Counterpropagation," Second Int. Conf. on Artificial Neural Networks, No. 349, pp. 252–256, November 1991. It was inspired by a similar vigilance neuron employed in Carpenter and Grossberg's adaptive resonance theory (ART). The ART model originally introduced this mechanism to control the importance of encoded patterns, in order to prevent the network from continuously readjusting to previously recognized patterns and to adapt to and acquire features for novel patterns without discarding learned ones.

Although the standard SOFM has many virtues, it is also plagued with a number bottlenecks, namely: i) the sensitivity of initial weights resulting in under/over-fitting of the input pdf; and ii) the "Nearest Neighbor (NN) Search Overload" resulting from the "curse of dimensionality"— exponentially increasing processing time required to perform a nearest neighbor (NN) search as both the dimensionality of the data space and cardinality of the training set become large. In addition, on the basis of my review of various SOFM applications, it was found that is it not only the convergence of the map that is important to ensure reasonable classification results, but also the manner in which we form abstractions of patterns on the basis of features extracted by the SOFM. An extension of SOM analysis, which we will call the self-organizing density map (SODM), will be presented in this section to resolve the issue of: (i) visualizing pattern clustering tendencies in X that have multiple attendant mappings in O2; and (ii) constructing a feature representation of whole radar images, for subsequent classification.

Case Study

The following discussion presents a case study of the HANN's pattern recognition performance using real-world volumetric radar data. This study involves two fundamental experiments: (i) a software simulation of the SOFM, to determine how well the feature extraction stage is capable of constructing a visually distinct representation of each SSE radar pattern class; and (ii) a software simulation of the CPN, to demonstrate whether the characterization derived in experiment (i) is separable on the basis of the CPN's classification accuracy. Furthermore, there is an evaluation of the relative efficiencies of two CPN variants, the FS-VCPN and the V-FS-FCPN, in terms of the minimum number of neurons needed to correctly classify a set of CAPPI images into one of a combination of four categories: (i) tornadoes, (ii) hail; (iii) rain; or (iv) macrobursts.

Classification Performance Measures

To assess the error rate three contingency table derived measures are used to quantify the classification accuracy of the HANN. These are: (i) the probability of detection (POD: conditional probability that the network correctly identifies the presence of an event); (ii) false alarm rate (FAR: conditional probability that the network incorrectly identifies the presence of an event); and (iii) Hanssen-Kuipers skill index (V-Index).

Selection and Acquisition of Training Set Data

In our experiments, we will classify a training set comprising 18 SSE events observed by the AES in the Canadian Prairies during the summers' of 1991 and 1993. These events were captured by a conventional volumetric weather radar in Vivian, MB, and Regina, SK, and then derived as a set of constant altitude plan position indicator (CAPPI: top view of precipitation along a horizontal plane) images at various altitudes.

To reduce the network's learning time, only a single CAPPI level will be used for training. Although it would appear preferable to select an altitude where the most features are present from each SSE class, namely, the 5 km level, the 3 km CAPPI was chosen, because this data field is smaller in size. Although 3 km CAPPIs are as large as 297×297 pixels, 5 km CAPPIs can exceed 481×481 pixels, and cover a radius of up to 200 km (image space dimensionality: $481^2=231,361$, containing up to $10^{6 \times 10^5}$ vectors). This reduction in vector dimension will likely translate into a computational savings during training.

However, it is expected that the HANN will have some difficulty distinguishing SSEs. The close spatial proximity of hail and tornadoes often results in the same distinctive echo for both classes (bow echo, line wave pattern, hook echo, (B)WER). Furthermore, SSEs do not always present themselves simultaneously at every CAPPI level [radar]. Since the reflectivity patterns of precipitation are only detected when the radar beam bounces off wet particles, "dry" hail and tornadoes/wind that are not accompanied by precipitation are not displayed on the CAPPI, and are therefore non-observable. Therefore, improved results can be anticipated by incorporating both three dimensional information of a storm's vertical structure, and image fields that are not sensitive to precipitation, but rather to the internal structure, movement, and rotation of a storm complex (Doppler data— velocity and spectrum width). [See M. Foster, "NEXTRAD Operational Issues: Meteorological Considerations in Configuring the Radar," Proc. 16th Conf. on Severe Local Storms, Kananaskis Park, Alta., Canada, Amer. Meteor. Soc., pp. 189–192, 1990].

The table below lists the ground truth information associated with each 3 km CAPPI training image:
  (i) CAPPI Class #—comprises two parts:
    (i) the type of SSE event (T—Tornado; H—Hail; R—Heavy Rain; W—High Winds and/or Macrobursts); and
    (ii) the index of the sample associated with the event type. For example, RW2 refers to the second training sample associated with a Heavy Rain and Wind Storm.
  (ii) Storm Complex—the structural organization of the storm environment associated with the event type. A combination of five categories are used to classify each storm complex within a given CAPPI:
    (a) Pulsed Cell (PS)—a single celled storm (as called by Wilk et al (1979)) that possesses brief bursts of intense updrafts, associated with large hail/tornadoes and popcorn shaped cumulonimbus clouds (CBs);

(b) Multicell (MC)—the most common type of storm complex, which are individually impulsive, but collectively persistent, and associated with all types of SSE events;

(c) Supercell (SC)—the less common, but most dangerous type of storm complex; assumes the form of an extensive plume or hook shaped echo, and associated with strong rotating updrafts, extremely strong echoes bounding regions of weak reflectivity (BWER)—strong precipitation gradients, and severe tornadoes (up to F5 intensity), wind shear/macrobursts/microburst and extremely large hail;

(d) Squall Line (SQL)—continuous or broken complex of storm cells that are aligned laterally over a distance large in comparison to the dimension of an individual cell, and associated with strong echoes, large hail, and occasionally weak tornadoes embedded at the leading edge; or (e) Intersecting Squall Line (I-SQL)—the most rare type of storm complex, associated with the same events as a SQL, but usually more brief and intense.

(iii) Observed Location—the approximate location where the event occurred (iv) Observed Date and Time—Y/M/D and AM/PM notation.

pixel values) less than 4. Although this value is very low in relation to the upper practical limit (maximum precipitation intensity=70 dB; therefore, maximum energy=$16 \times 70^2 = 78,400$), these weak intensity blocks may be part of a global structure, such as distinctive SSE echo (WER, Line, hook; (weak echo overhang or strong gradient are indicative of hail and tornadoes), and therefore have a significant impact on the gradient context of neighboring blocks.

By partitioning the image into equal sized blocks, all localities are treated with equal importance. The feature representation is made more resilient to isolated regions that might be obscured by noisy echo returns (side lobe distortion, range folding).

To obtain a more robust classification, in terms of recognizing that the macro-structure of a storm complex is often indicative of the type of events embedded within it locally, the third stage of preprocessing entailed the construction of an input vector that makes use of contextual information. Therefore, in addition to preserving local block features, statistical information (mean, variance, and maximum values) from a 9 block nearest neighbor region were concatenated with the 16 block components, to form a 19 dimensional input vector. Blocks with inconclusive contextual information (regions with artifacts or near edges of image), were omitted from the training set. Images that are concentrated with relevant data in these areas may lack a

TABLE 1

Training Set Information

| CAPPI Class # | Storm Complex | Observed Location | Date (Y/M/D) | Observed Time | # of 4*4 Block Fragments |
|---|---|---|---|---|---|
| T1 | MOC/SC | 7 km W of Wynyard | 91/08/02 | 9:30 AM | 1389 |
| T2 | PS | SE of Vanguard | 91/07/04 | 5:40 PM | 28 |
| T3 | I-C-SQL | SE of CFG Moose Jaw | 91/07/06 | 4:10 PM | 894 |
| T4 | B-SQL | 16 km from Avonlea | 91/07/06 | 5:15 PM | 880 |
| T5 | MPC/B-SQL/SC | 24 km N of Easton | 91/07/10 | 11:55 AM | 882 |
| T6 | MPC/B-SQL/SC | Fox Valley | 91/07/10 | 5:10 PM | 759 |
| T7 | MPC | 5 km W of Brookdale | 93/06/12 | 6:00 PM | 104 |
| T8 | SC | Fort Alexander | 93/06/12 | 11:50 PM | 146 |
| T9 | MPC | Gladstone | 93/06/22 | 8:45 PM | 129 |
| TH1 | I-C-SQL | 16 km W of Briercrest | 91/07/06 | 4:30 PM | 936 |
| H1 | MPC/B-SQL | Grass River | 93/06/11 | 9:30 PM | 179 |
| H2 | PS | S of Gilbert Plains | 93/06/12 | 5:00 PM | 52 |
| H3 | PS | Cowan | 93/06/12 | 7:00 PM | 25 |
| RH1 | MPC/SC | West Kildonan & Crestview | 93/08/08 | 10:05 PM | 708 |
| RH2 | MPC/SC | N/A | N/A | N/A | 908 |

Formulation of HANN (SOFM) Input Vectors

In order to prepare the data in a format suitable for presentation to the HANN (SOFM), the CAPPI images were preprocessed in three stages.

First, given that the CAPPI data are too large to be processed by the SOFM, each of the 18 images was partitioned into mutually exclusive block vectors using an image fragmentation module. The size of the block was selected such that the network training time would be tractable on a PC computer, while at the same time large enough for a trained analyst to accurately detect features in the data. A 4×4 pixel region (~16 km$^2$) was selected because this size is small enough to capture features of the most severe microscale phenomena, namely, tornadoes and microbursts/macroburst.

Second, to prevent the SOFM from mistakenly interpreting redundant data as relevant features, a thresholding scheme was applied to sift out blocks with significant precipitation intensity. Therefore, the threshold was set to reject blocks with an energy (quadratic sum of all 16 block sufficient amount of statistical information to be separable in the feature space. Therefore, to allow information to be captured along the center and boundaries of the viewing plane, future studies should incorporate CAPPI data from multiple radar orientations. The distribution of CAPPI image blocks resulting from the above procedure is shown in the last column of Table 1.

The training set patterns have now been prepared for presentation to the SOFM.

Experiment #1: Feature Representation of CAPPI Storm Images

The objective of this experiment is twofold, namely, (i) to develop a codebook of SOFM features for the training set; and (ii) to derive from the codebook a SOM density characterization of each CAPPI image. Furthermore, a discussion of the experimental results as they relate to the mapping's separability will be presented.

Experimental Procedure

The SOFM simulator was configured to extract a codebook of features from the training set. The selected network structure comprises 19 input neurons (16 inputs originating from the 4×4 block vector and 3 inputs associated with the statistical vector (contextual information of neighboring blocks, mean, variance, and maximum), and 225 output neurons arranged on a two dimensional lattice, corresponding to the size of the codebook. The criteria used to select the map size is based on a similar argument used to select the training block dimension, namely, (i) minimization of training time; and (ii) maximization of available memory resources.

The network was initialized in the following manner: The weights were set to small random values (0.1 to 0.2) so that no particular neuron in the map would be biased to respond to any particular pattern in the training set. Although it has been shown that convergence of the map can be accelerated by initializing the weights to the average value of the training set (with small random perturbations), this approach was dismissed for the following reasons: (i) if the distribution of CAPPI patterns (patterns not completely represented by the training set) lies close to the mean, the resulting dynamic range of the network weights would be narrow, making the SOFM more vulnerable to unstable states; and (ii) to adjust for this problem, the learning rate would have to be tailored to a smaller value. Therefore, we relied on the self-organizing process to pull the weights towards an optimal configuration.

The adaptation parameters were initialized. A square shaped neighborhood update region was used, and set to a radius of 7, such that when the central neuron fired, the region spanned the entire map. The size of the neighborhood was decreased monotonically with time to a value of 1, to allow the SOFM to settle gradually from a rough global ordering to a finer local ordering. Although some applications allow the update radius to shrink to 0 [SOM] (when the winner of the competition is the only neuron that adjusts its weights), so that the cells can become more finely tuned to different patterns, this approach is not used because the SOM density characterization that will be derived from the SOFM tends to produce better clustering results when the neighborhood is not kept too small.

Following network initialization, the SOFM was trained on the entire input set (randomly selected inputs without replacement), using the topology preserving learning algorithm and probing mechanism as discussed above. Training patterns were presented to the SOFM in random order, to prevent the entire map from responding too sharply to patterns, whose class frequencies are higher than others in the training set.

The win frequency variance was chosen as the primary indicator of convergence over two other prominent measures, stability and the maximum/mean squared error. Stability is the rate of change of weight vectors between training steps. The maximum/mean squared error is the ratio of the maximum/mean correction vector length and the learning rate. The motivation for this selection is threefold: (i) the stability indicator was dismissed because there were insufficient memory resources available to maintain both the network's current and previous state; (ii) since the objective is not about maximizing the SOFMs quantization accuracy, but rather about preserving the quality of the map's feature separability, a convergence measure based on an error criterion would be inappropriate. Furthermore, since SOFM learning is an unsupervised process, the error cannot actually be used to quantify this measure. Unlike these other measures, the win frequency variance is a more natural indicator of convergence, because its roots are based on the well founded partition property of the map. Using the nearest neighbor rule to mediate the competition among neurons tends toward an equilibrium partition of the map into equal size Veronoi regions [Winning weighted]. This partition property implies that the win frequency of neurons have a tendency to converge towards a statistically equiprobable state. Ideally, convergence is attained when the variance of the neural matching rates (win frequency variance) are zero. In practice, this value may never be reached, because there is no mechanism in the SOFM, external to its neighborhood learning rule, that will allow it to escape from local minima. Therefore, it is assumed that convergence is near when both the win frequency variance approaches zero and does not fluctuate between training steps. This measure (win frequency variance) was monitored on an epoch by epoch basis until the convergence criteria were satisfied, at which point training was terminated.

Experimental Results and Discussion

FIG. 5 shows the energy surface of the SOFM codebook upon convergence of training—after 4 epochs.

The smooth gradation from low (light grey) to high energy (dark grey) codewords along the two dimensional surface of the map indicates as expected, a continuous landscape in the global sense. Observation of Matrix 5, corresponding to FIG. 5, shows that nearby codewords in the map have similar energy features. The energy matrix corresponds with the plot of the SOFMs energy surface. The elements are labeled in standard matrix notation, but plotted as a reflection. The first value in the table (93854) was omitted from the plot to enhance its global dynamic range for visual observation.

As expected through the use of the NN-probing search, small folds and a few local discontinuities (singularities) are present in regions with both mid (~12,000; center of map) and high energies (~25,000; west edge of map). This result confirms the theoretical need for a vigilance mechanism in the FCPN, as discussed in the foregoing.

Figure 6:
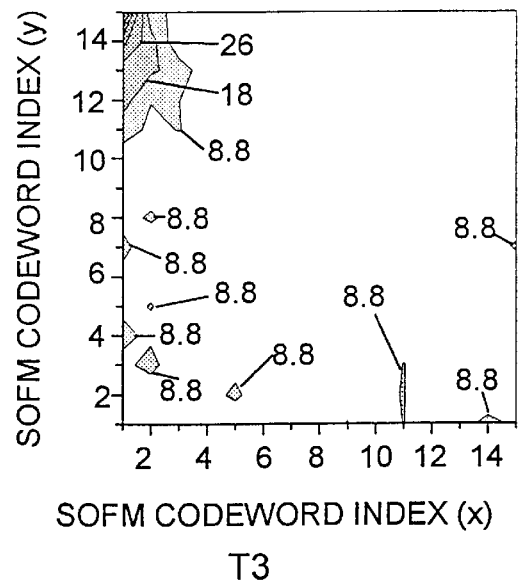
Figure 7:
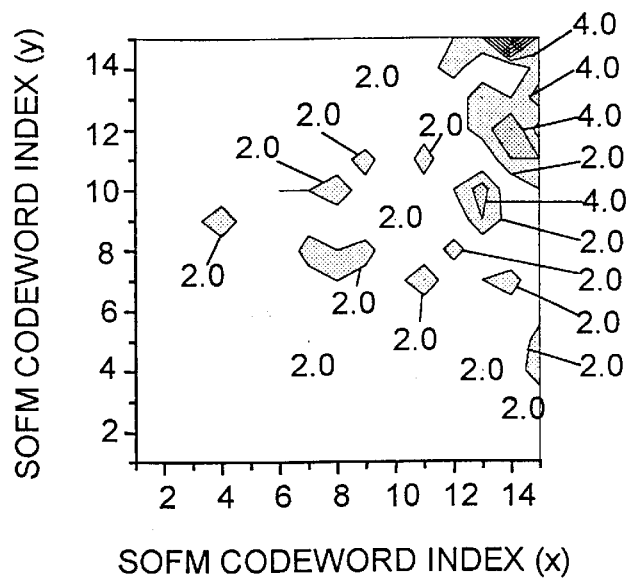
Figure 8:
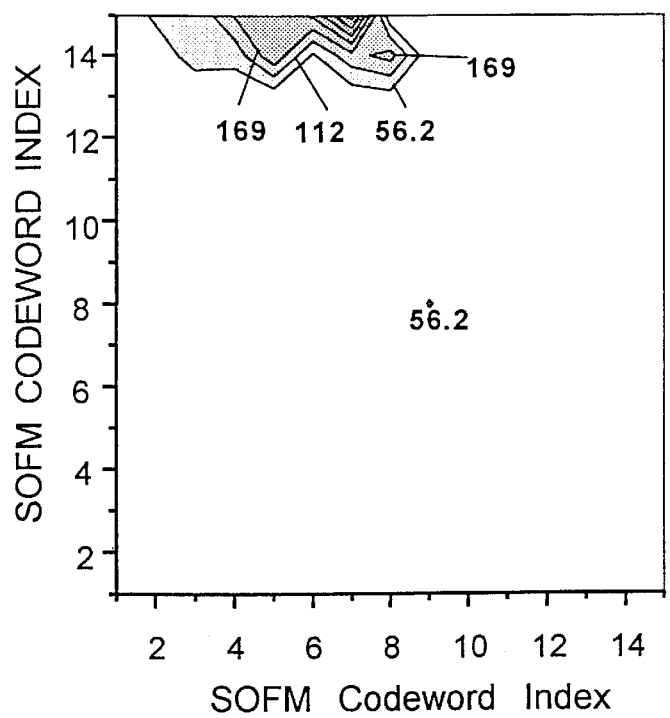
Figure 9:
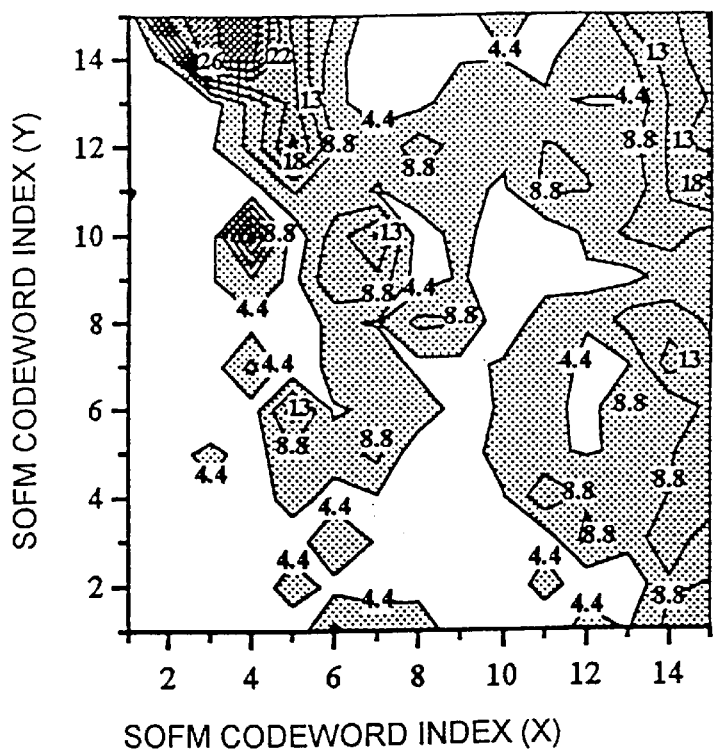
Figure 10:
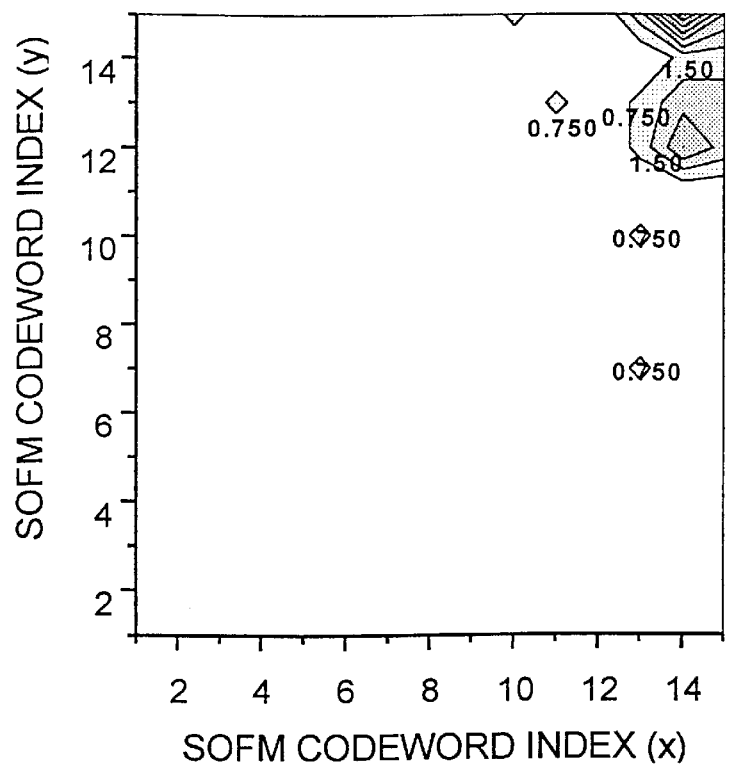
Figure 11:
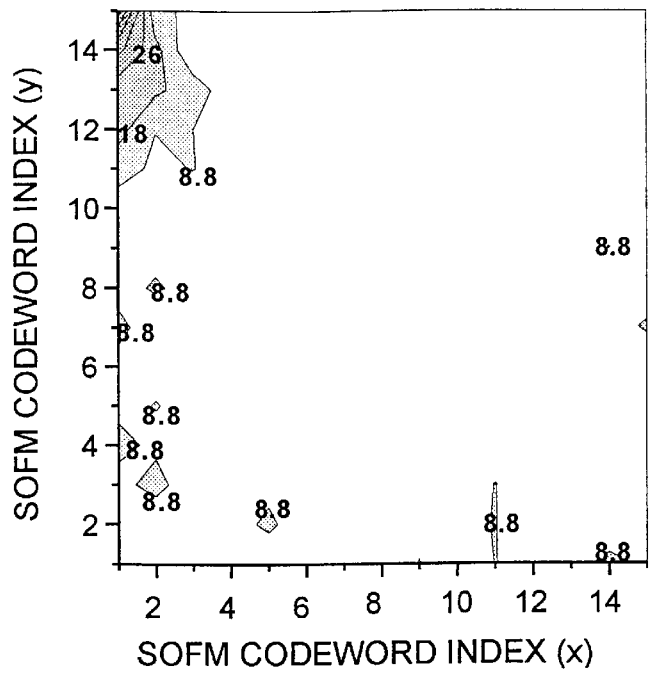
Figure 12:
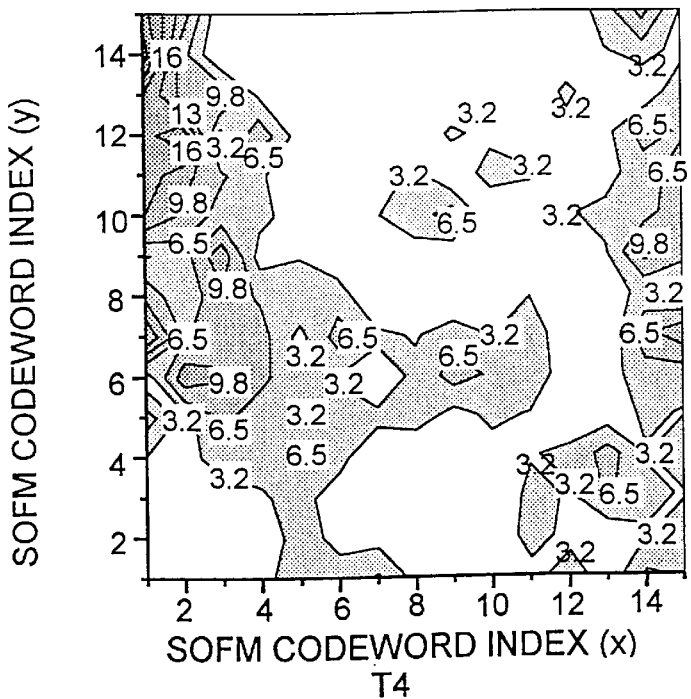
Figure 13:
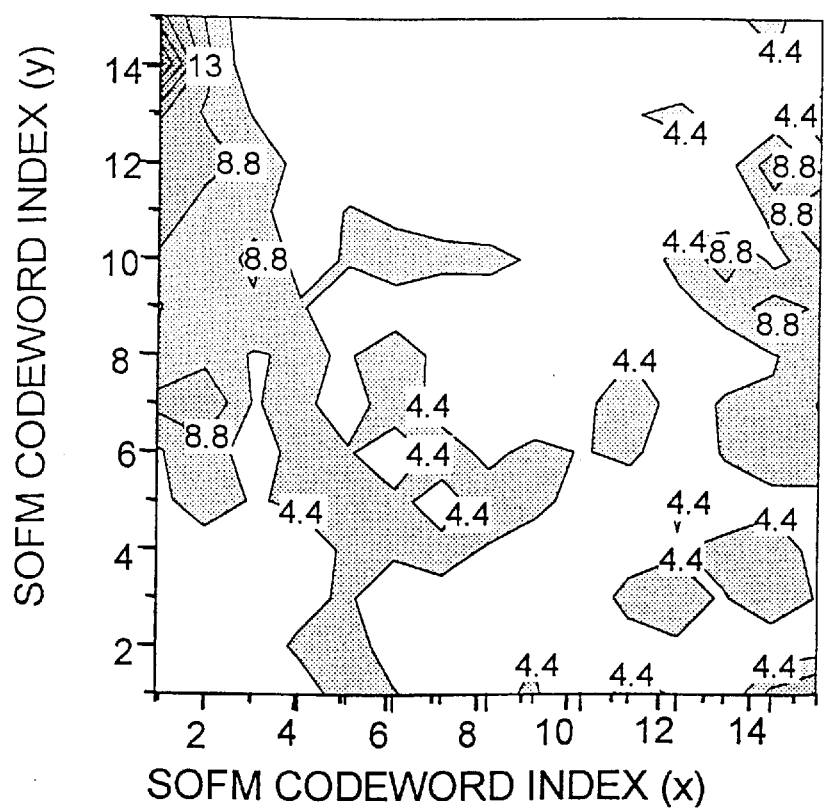
Figure 14:
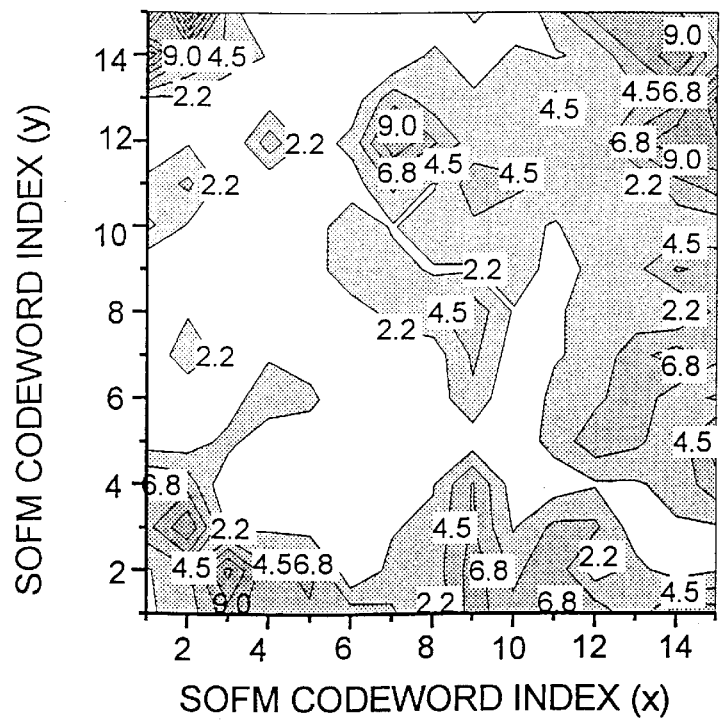
Figure 15:
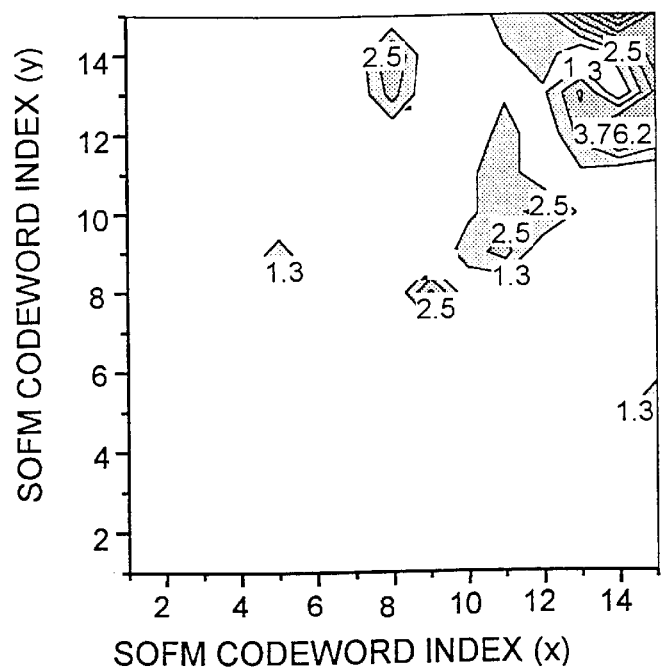
Figure 16:
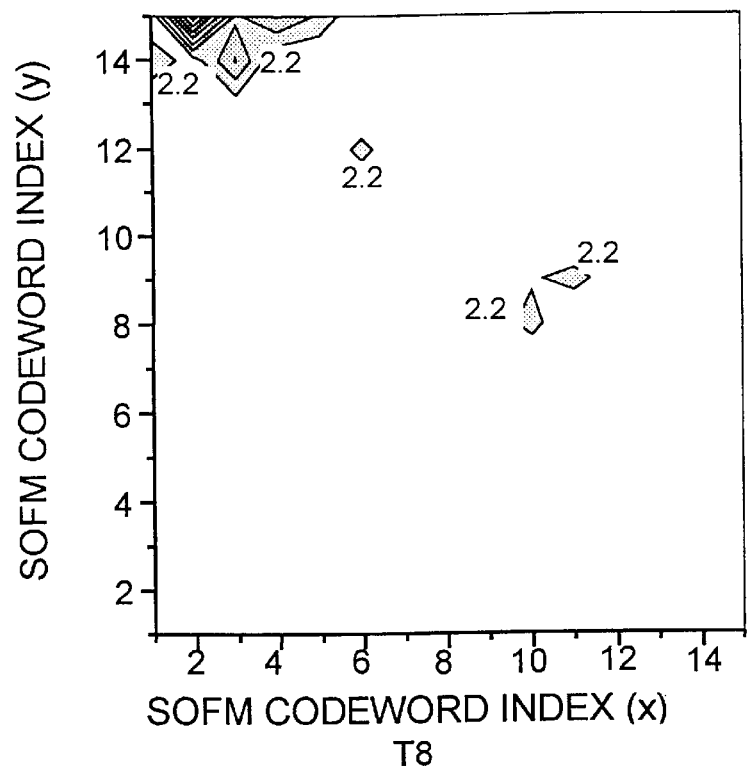
Figure 17:
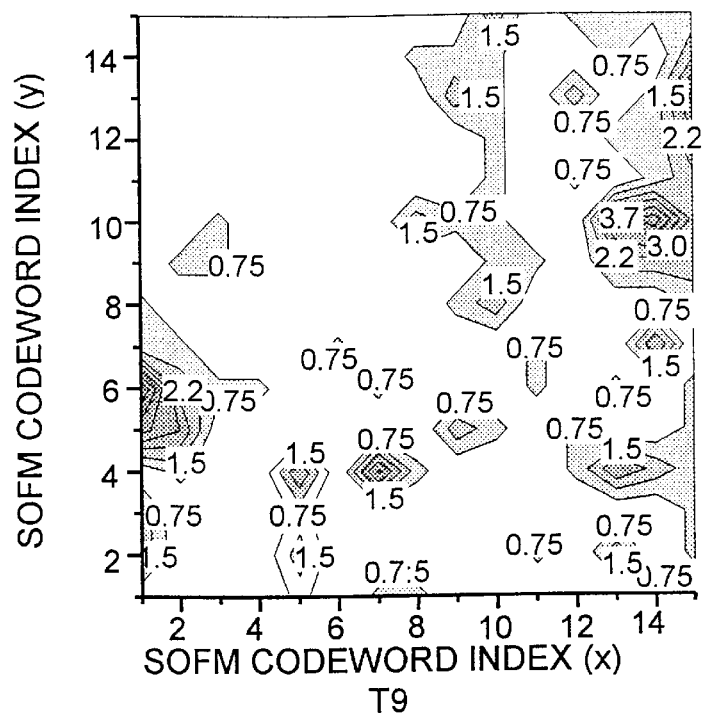
Figure 18:
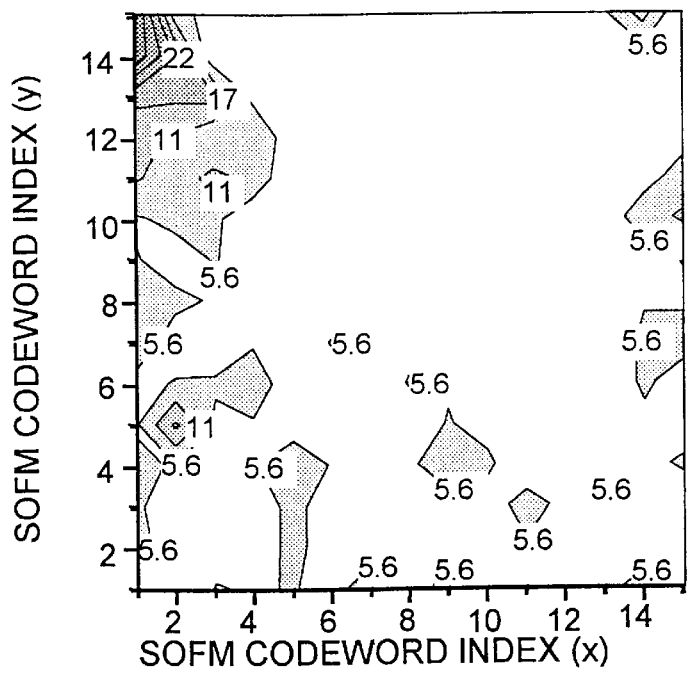
Figure 19:
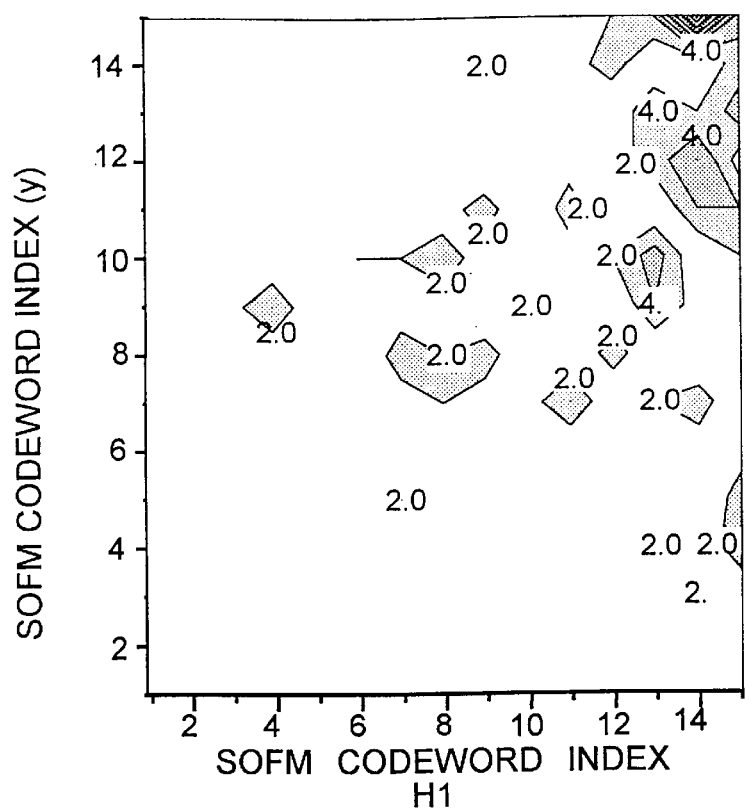
Figure 20:
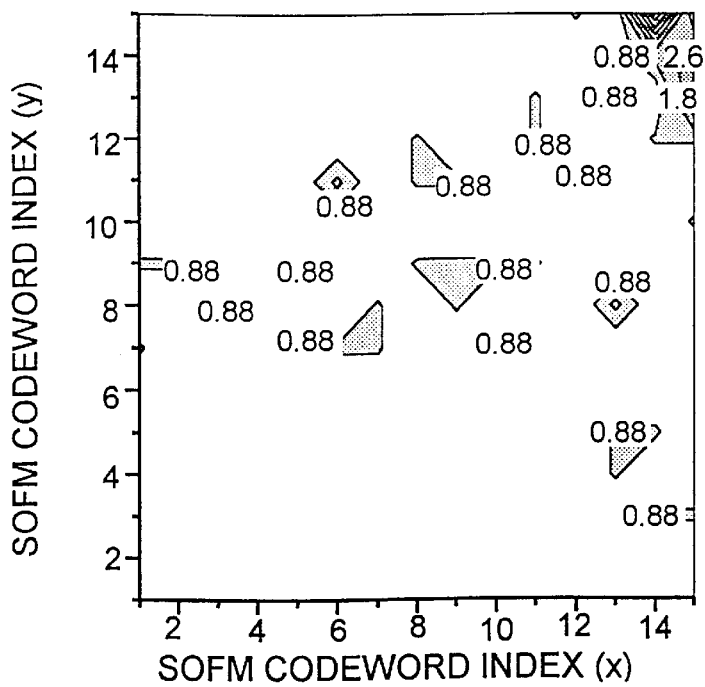
Figure 21:
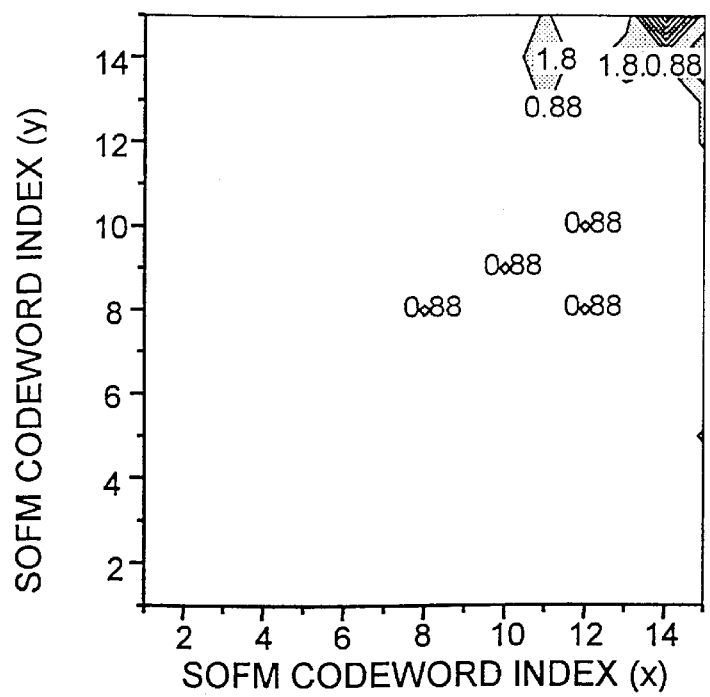
Figure 22:
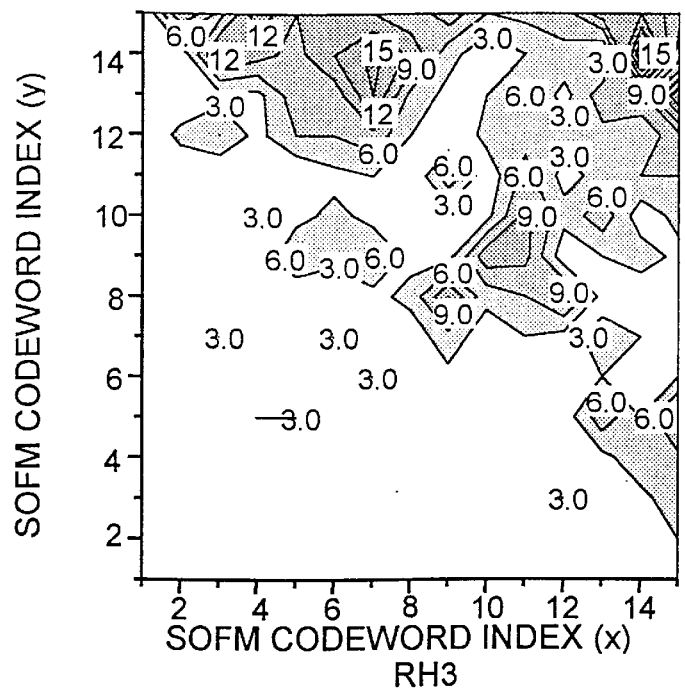
Figure 23:
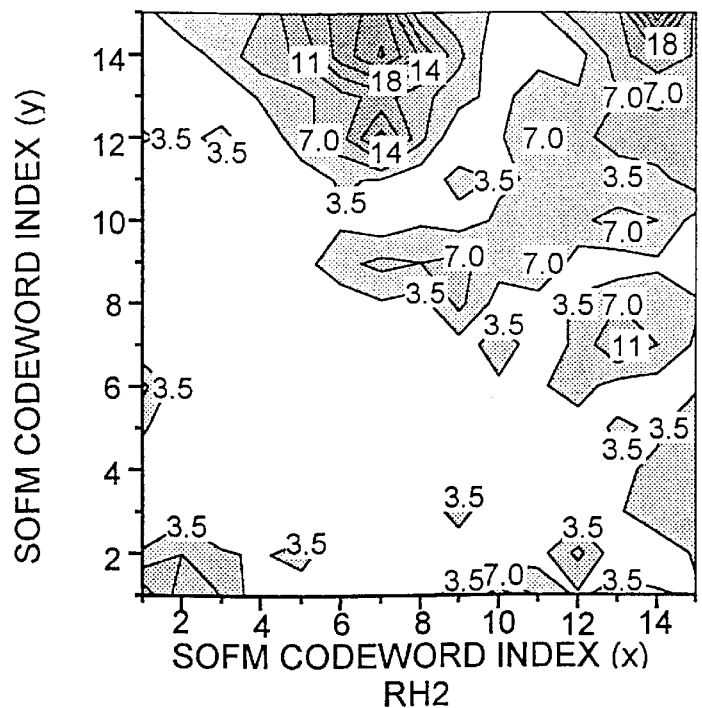
Figure 24:
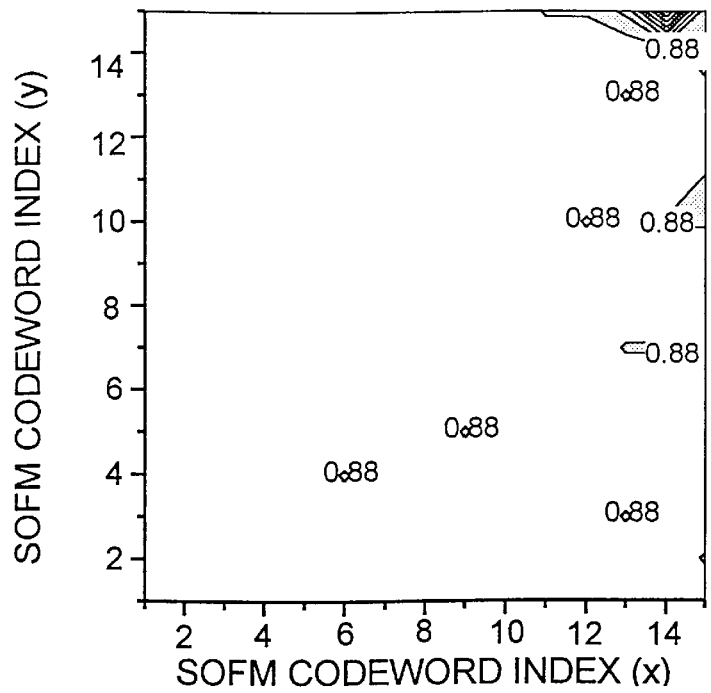
Figure 25:
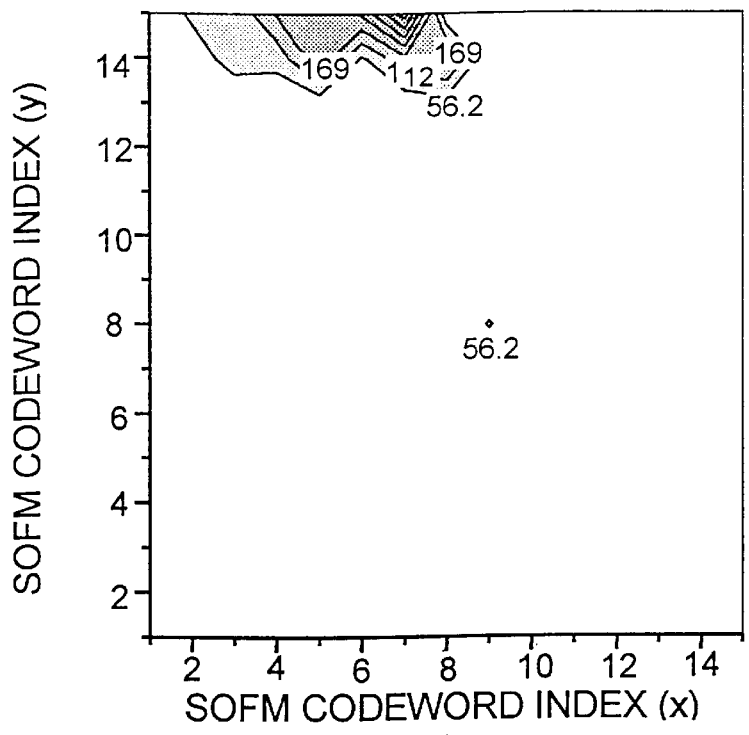
Figure 26:
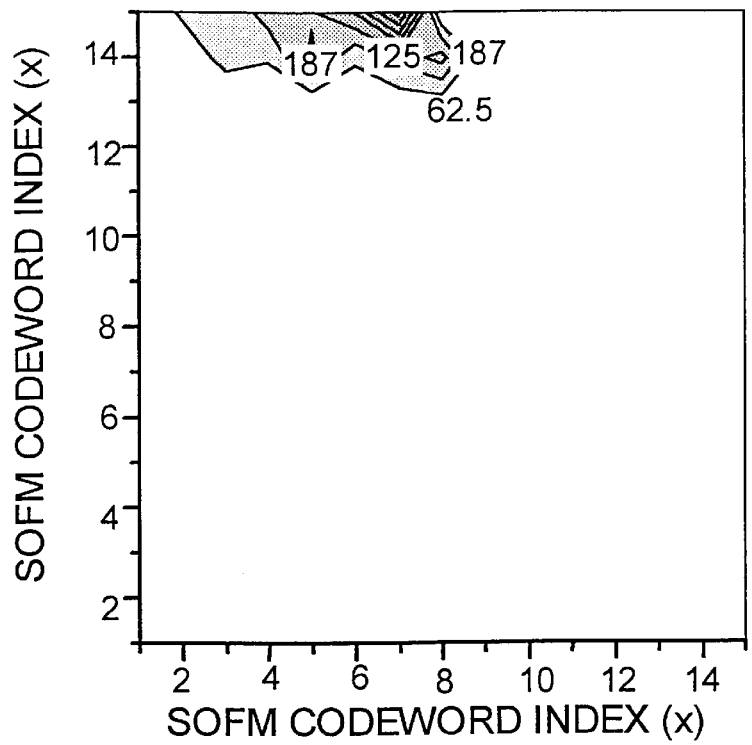

A sample of the frequency distribution of codebook features for each class of CAPPI images is depicted by the SODMs, as shown in FIGS. 6 to 8 and the corresponding matrices. Visual inspection of the SODM shows a clearly defined feature structure for each image class, indicating that decision regions are somewhat separable and distinct. Dark and Light regions in the SODM identify dense and sparse clusters respectively of training blocks in the CAPPI that have feature projections characterized by the weights of neurons in corresponding energy regions of the SOFM. Since the topology preserving learning algorithm has preserved the neighborhood relations between the training patterns in the image and feature space, the degree of feature diversity for each CAPPI can be assessed qualitatively by examining the geometric distances between the clusters centers (dense regions carved out by contour lines) in the SODM.

The SODMs in FIGS. 6 to 8 show characteristic training patterns for various weather events. The training patterns from tornadic CAPPIs have a broad spectrum of features that are densely distributed in the northwest/west portion of the map. Hail CAPPIs have a narrow spectrum of features that are densely populated in the north-east region of the map. Wind CAPPIs have features that are densely packed in the north-central sector of the map. CAPPIs with multiple storm classes (tornado-hail, rain-wind, rain-hail) have feature distributions that vary from either class, indicating that singularities, for example discontinuities or inconsistencies may be present in the mapping. This result reconfirms the theoretical need for a vigilance mechanism in the FCPN, as stated above. The SODMs corresponding to the remainder of the CAPPI images are shown in FIGS. 9 to 26 and the corresponding Matrices.

The correspondence between cluster regions in the SODM and the energy of neural weights in the SOFM were analyzed to determine whether the energy distributions of CAPPI features are consistent with our understanding of SSEs. They appear to be consistent, because the events associated with intense and weak precipitation patterns project onto regions of the SODM that correspond with intense and weak energy weights in the SOFM. Heavy rain, tornadoes, and hail mapped onto strong energy regions, while wind projected onto weaker ones. Since the input vectors are not solely derived from the precipitation intensity of pixels in the image block, but also from statistical information of surrounding blocks, SSEs associated with strong precipitation gradients (BWER), but weak overall precipitation intensity (tornadoes, hail), would cause the Euclidean energy competition/distortion metric to produce the same mapping for events accompanied by strong precipitation and weak gradients.

An input vector will now be constructed from the SODM prior to training the CPN. The hierarchy of the HANN has now been truly revealed, for classification cannot take place until the first ANN stage has developed a faithful representation of the CAPPI feature space.

Formulation of CPN Input Vectors

Since the CPN uses supervised learning for classification, two input vectors were established for presentation to the network, a feature vector derived from the SODM for input to the fan out layer, and an associated target vector for input to the training layer. The feature vector was selected, such that, without elaborate preprocessing, it would satisfy three geometric properties. These are invariance to: (i) lateral scale; (ii) translation; and (iii) rotation—rigid body motion. Property (i) must be enforced for two reasons The atmospheric mechanisms which are responsible for a given SSE radar structure generally do not change with size. The lateral extent of a storm complex, ceteris paribus, does not usually reflect the severity of local SSE features. Pulsed cells (small popcorn shaped CBs) can be just as intense as larger multi-cell clusters. The same can not be said for a storm's vertical structure, because the height of a CB is often related to its severity. However, some difficulties in the feature representation may occur, because the environmental condition responsible for a storm's physical structure, unicell, multicell, squall line or supercell, can influence its dimension. For instance, even though different SSEs accompany different structures, the density characterization of a storm would simply treat a large single cluster of reflectivity echoes (supercell) as it would a group of smaller clusters. While this may appear to be a serious dilemma, its resolution is a nonvoluntary action of the SODM, because the density distribution of SOFM features can be used to distinguish: between clusters of different structures and, in essence, between SSEs of different classes.

The latter two properties are based on the premise that the structure of distinctive SSE echoes are similar for a storm that occurs in Winnipeg or Regina, or approaches from the northwest or south-east.

The concatenation of elements in the SODM is a prime candidate for the feature vector, because "density," the basis of the mapping, is by definition a characteristic property. The elements of this vector are normalized to unit length to preserve the intra density characteristic of a each class; and relative importance of one feature in relation to another.

Experiment #2: Justification of SOFM Feature Separability

The primary objective of this experiment is to evaluate the efficiency of the CPN training algorithm FS-VFCPN in terms of the minimum number of neurons needed to correctly classify the set of 18 CAPPI images into one of a combination of four categories: (a) tornadoes, (b) hail; (c) heavy rain; and (d) macrobursts. Furthermore, these results will be used to verify the quality of the SODM feature characterization.

Experimental Procedure for Evaluation of FS-VFCPN

The CPN simulator was configured to learn the classification of the SODM CAPPI characterizations using vigilant frequency sensitive (conscience) learning, as described above. The CPN structure was selected to have 225 fanout PEs, corresponding to each element of the normalized SODM, 8 instar PEs, and 4 outstar PEs, corresponding to each of the SSE classes.

Although the lower bound of the instar complexity fit is 4 (because there are 4 possible output identities: tornado; hail; rain; wind), experimental results from the first HANN stage (observation of training patterns) show that there are some CAPPI images which have similar SODM profiles, but different output identities or have the same output identity, but different cluster centers (as depicted by the geometric distance between dark (dense) regions in the map. (tornado1, 2, 3 appear similar; hail1, hail2, hail3+distances). While the separation of the latter patterns require a separate instar PE to become attuned to each pattern through competitive learning, the former patterns can be correctly identified by using the vigilance mechanism to encode the correct pattern class relationship in a one shot learning process. Therefore, the size of the basic instar layer was selected to be twice the width of the outstar layer, to allow for a minimum of two instar PEs to respond to patterns from a single class. Four instar PEs were reserved for vigilance learning, to accommodate the classification of the singular/discontinuous mappings.

The network was initialized as follows. Although the conscience mechanism does not place any constraints on the initial values of the instar and outstar weights, they were set to small random values (0.1,0.2) for reasons similar to the previous experiment. The adaptation parameters were also appropriately set in accordance with the heuristics prescribed in the preceding discussion.

Since the CPN training process comprises two stages, two measures were used to asses its convergence. The win frequency variance of instar PEs was used an indicator of the Veronoi equilibrium partition property. The Hanssen Kuipers index (V-Index) was used as an indicator of the network's classification skill in relation to that of an unskilled classifier. Unlike in the SOFM experiment, an indication of the win frequency variance can also be obtained by observing either the win frequency bias values ($\pi=1/N$) or the bias term vector (constant biases for all terms; B=0).

Once the network was fully configured, it was trained on randomly selected patterns (without replacement) from the entire training set, for the same reasons as outlined in the previous experiment. However, the process of training (as defined in the steps below), was more elaborate than that of the SOFM, because the CPN incorporates more training mechanisms and processing layers, which have nonlinear interactions between them.

The instar layer was trained until equiprobability was achieved (4 epochs; as indicated by the win frequency, FIG. 24), at which point, outstar training commenced.

Figure 27:
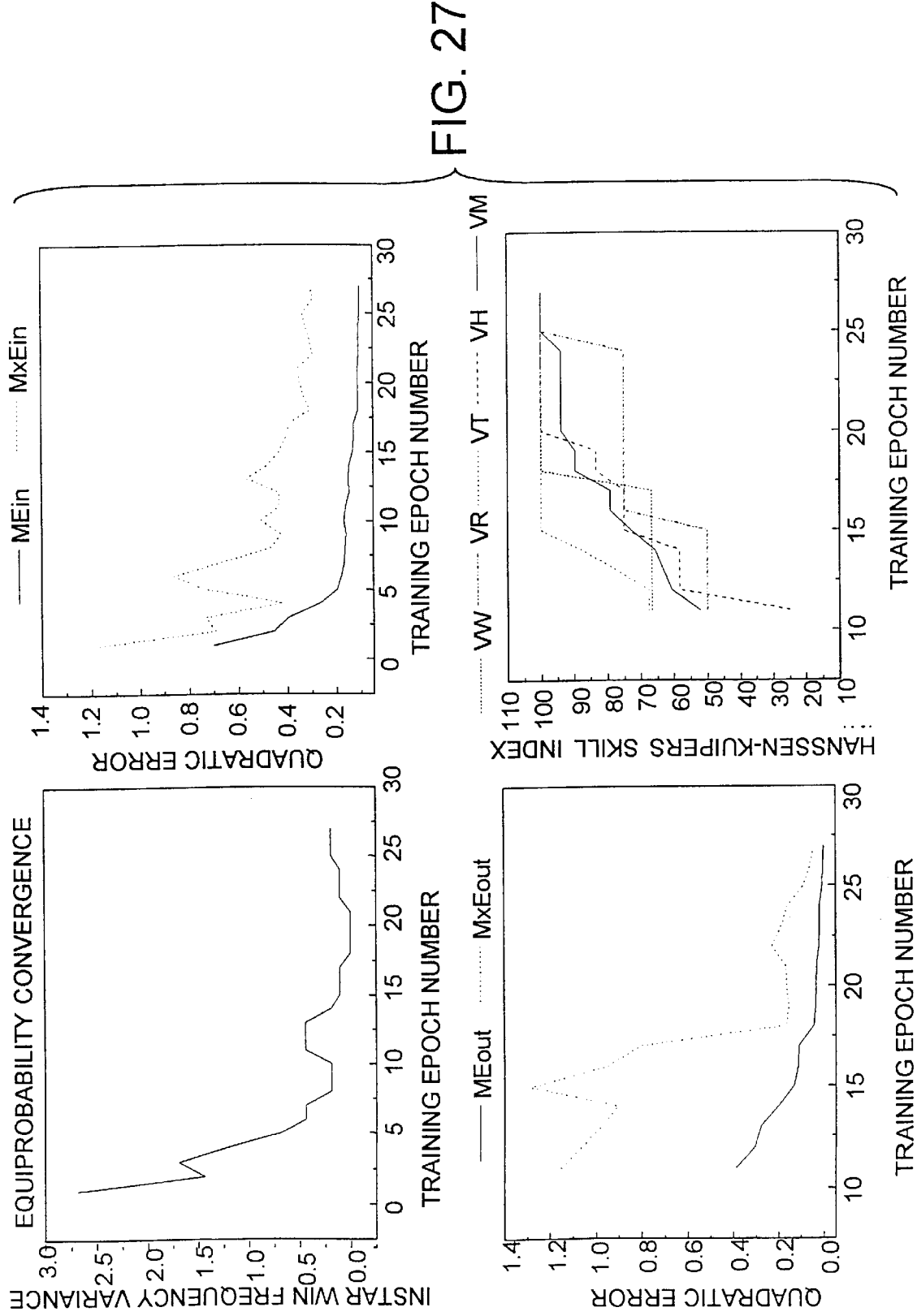

The vigilance mechanism was inhibited until the outstar PEs learned to associate an identity for each instar class (as indicated by an steady increase in V-index values, followed by a plateau in FIG. 27).

If some patterns were misclassified, the vigilance mechanism was activated with a single reserved instar PE (R=1), otherwise, training was terminated. Although it would seem that q reserved neurons would be needed to accommodate the classification of q incorrectly identified patterns (problem pattern), results in the following section indicate otherwise, because some of these patterns did not actually belong to singular classes (1t3,3t4). This result can be accounted for. Since the network self-organizes in response to the entire training set prior to the activation of vigilance learning, the inducement of a single reserved neuron would filter out a "problem pattern" from partaking in this process, and as such would give the network more freedom to self-organize in response to the remaining patterns (incorrectly identified).

Therefore, every time a reserved neuron was activated, the vigilance mechanism was shut off, until the instar layer reached an equiprobable configuration.

If all patterns were identified correctly (V–Index=1) at this point, training was terminated, otherwise, the vigilance mechanism was not reactivated (with an additional reserved neuron; R=R+1; now R=2), until outstar training resulted in another V–index plateau.

The process was reiterated until 100% classification accuracy was obtained, at which point the optimal (minimum) complexity fit of the network was established.

The results of the case study confirm the effectiveness of the HANN for recognizing and identifying SSE patterns in the weather radar images. These results can be extrapolated to other data matrices, where the recognition of characteristic patterns would be useful. Examples are some forms of financial and medical data where the sheer volume of data makes it difficult to ascertain manually whether any identifiable pattern exists.

Thus, while one embodiment and application of the present invention have been described in the foregoing, it is to be understood that other embodiments and applications are possible within the scope of the invention and are intended to be included herein. The invention is to be considered limited solely by the scope of the appended claims.

Embodiments of the invention in which an exclusive property op privilege is claimed are defined as follows:

1. A method of processing plural object data matrices to identify characteristic features therein, said method comprising:
   A producing a trained self organizing feature space mapping by:
      i) providing a set of training data matrices containing the characteristic features to be identified;
      ii) fragmenting each of the training data matrices into plural elements; and
      iii) processing each element of each training data matrix with a single self organizing network to produce a single trained self organizing feature space mapping (SOFM); and
   B identifying the characteristic features in each of the object data matrices by:
      iv) fragmenting one of the object data matrices into plural object matrix elements;
      v) processing the object matrix elements with the single SOFM to produce a feature characterization of the object data matrix;
      vi) processing the feature characterization to produce a density characterization of characteristic features in the object data matrix; and
      vii) repeating steps iv), v) and vi) for each of the object data matrices.

2. A method according to claim 1 including providing image data and deriving the data matrices from the image data.

3. A method according to claim 2 wherein the image data is three dimensional image data representing a three dimensional space.

4. A method according to claim 3 wherein the three dimensional image data is weather radar image data.

5. A method according to claim 4 wherein the feature vectors represent energy.

6. A method according to claim 3 including providing the plural object data matrices by processing the three dimensional object image data to provide a plurality of sectional object data matrices representing respective cross sections of the three dimensional object image space, processing each of the sectional object data matrices with the self organizing network to produce a density characterization of characteristic features in each of the sectional object data matrices.

7. A method according to claim 6 including concatenating the density characterizations to provide a single density vector representation of the three dimensional object image data.

8. A method according to claim 6 including removing from each set of sectional data matrix elements of the matrix having a magnitude less than a predetermined threshold before processing the matrix with the self organizing network.

9. A method according to claim 6 wherein the three dimensional object image data is weather radar image data and the sectional object data matrices represent respective constant altitude plan position indicator (CAPPI) images on parallel planes.

10. A method according to claim 7 including normalizing the density characterizations of the self organizing feature space mappings before concatenation.

11. A method according to claim 1 comprising providing a density vector representation of the density characterization of the object data matrix and classifying the density vector representation.

12. A method according to claim 11 including displaying a representation of classified features in the object data matrix.

13. A method according to claim 12 including providing three dimensional weather image data, deriving the object data matrix from the image data and wherein the classified features are severe storm events.

14. A method according claim 1 wherein the self organizing feature space mapping is a self organizing feature map.

15. A system for processing plural object data matrices to identify characteristic features therein, said system comprising:
   A means for producing a trained self organizing feature space mapping, including:
      i) a set of training data matrices containing the characteristic features to be identified, each training data matrix fragmented into plural elements; and
      ii) a single self organizing network for processing each element of each training data matrix to produce a single trained self organizing feature space mapping (SOFM);
   B means for identifying the characteristic features in each of the object data matrices including:
      iii) means for fragmenting each of the object data matrices into plural object matrix elements;
      iv) means for processing the object matrix elements with the single SOFM to produce a feature characterization of each object data matrix; and v) density map processing means for processing each feature characterization to produce a density characterization of the characteristic features in the object data matrices.

16. A system according to claim 15 including means for providing image data and means for deriving the data matrices from the image data.

17. A system according to claim 16 wherein:
the image data is three dimensional image data representing a three dimensional space;
the system includes image slicing means for processing three dimensional object image data to provide a plurality of sectional object data matrices representing respective cross sections of a three dimensional object image space; and
the self organizing network means comprises means for processing each of the sectional object data matrices to produce a density characterization of the characteristic features in each of the sectional data matrices.

18. A system according to claim 17 including data acquisition radar means for providing three dimensional weather image data and image processing means for deriving the data matrices from the image data.

19. A system according to claim 18 wherein the image processing means comprise means for producing constant altitude plan position indicator (CAPPI) images on parallel planes.

20. A system according to claim 14 including means for displaying characteristic patterns of severe storm events.

21. A system according to claim 17 including means for concatenating the density characterizations to provide a single density vector representation of the three dimensional object image data.

22. A system according to claim 21 including means for removing from each set of sectional object data matrix elements of the matrix having a magnitude less than a predetermined threshold before processing the matrix with the self organizing network.

23. A system according to claim 21 including means for normalizing the density characterizations of the self organizing feature maps before concatenation.

24. A system according to claim 15 comprising means for providing a density vector representation of the density characterization of the data matrices and classification means for classifying the density vector representation.

25. A system according to claim 24 including display means for displaying a representation of classified features in the data matrices.

* * * * *